United States Patent
Miyazawa

(10) Patent No.: US 10,097,111 B2
(45) Date of Patent: Oct. 9, 2018

(54) PIEZOELECTRIC DRIVE DEVICE AND ROBOT

(71) Applicant: Seiko Epson Corporation, Tokyo (JP)

(72) Inventor: Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 255 days.

(21) Appl. No.: 15/058,442

(22) Filed: Mar. 2, 2016

(65) Prior Publication Data

US 2016/0261211 A1    Sep. 8, 2016

(30) Foreign Application Priority Data

Mar. 4, 2015    (JP) ................. 2015-041957

(51) Int. Cl.

| H02N 2/02 | (2006.01) |
|---|---|
| H01L 41/04 | (2006.01) |
| H02N 2/00 | (2006.01) |
| B25J 9/12 | (2006.01) |
| B25J 15/02 | (2006.01) |
| H02N 2/10 | (2006.01) |

(52) U.S. Cl.
CPC ............ *H02N 2/001* (2013.01); *B25J 9/12* (2013.01); *B25J 9/123* (2013.01); *B25J 15/0293* (2013.01); *H02N 2/004* (2013.01); *H02N 2/103* (2013.01)

(58) Field of Classification Search
CPC .................. B25J 9/12; H02N 2/103
See application file for complete search history.

(56) References Cited

U.S. PATENT DOCUMENTS

| 8,693,116 B2 | 4/2014 | Kuwano et al. |
| 2002/0014814 A1 | 2/2002 | Yasuda |
| 2004/0212278 A1 | 10/2004 | Miyazawa |
| 2004/0256956 A1 | 12/2004 | Miyazawa |
| 2006/0113867 A1 | 6/2006 | Sakatani et al. |
| 2008/0297340 A1* | 12/2008 | Popa .................. B25J 13/08 340/539.1 |
| 2009/0285664 A1* | 11/2009 | Kim .................. B25J 9/1612 901/31 |
| 2011/0241488 A1 | 10/2011 | Kimura |

(Continued)

FOREIGN PATENT DOCUMENTS

| EP | 0633616 A2 | 1/1995 |
| EP | 1641053 A2 | 3/2006 |

(Continued)

OTHER PUBLICATIONS

T. Hemsel et al., "Piezoelectric Linear Motor Concepts Based on Coupling of Longitudinal Vibrations", Ultrasonics, vol. 44, pp. e591-e596 (2006).

(Continued)

*Primary Examiner* — J. San Martin
(74) *Attorney, Agent, or Firm* — Harness, Dickey & Pierce, P.L.C.

(57) ABSTRACT

A piezoelectric drive device includes multiple piezoelectric drive units that have a contact portion which can come into contact with a driven portion, and that have a piezoelectric substance. The number of the multiple piezoelectric drive units is 10 or more, an overall output from the multiple piezoelectric drive units is 0.3 W or greater, and a weight of the piezoelectric drive unit is 1 µg to 5 g.

10 Claims, 17 Drawing Sheets

(56) References Cited

U.S. PATENT DOCUMENTS

| | | | | |
|---|---|---|---|---|
| 2012/0048027 A1* | 3/2012 | Hashiguchi | ............ | B25J 9/0087 |
| | | | | 73/763 |
| 2012/0279342 A1* | 11/2012 | Yasukawa | .............. | H02N 2/103 |
| | | | | 74/490.03 |
| 2013/0238129 A1* | 9/2013 | Rose | ........................ | B25J 18/00 |
| | | | | 700/258 |
| 2014/0001922 A1 | 1/2014 | Wischnewskiy et al. | | |
| 2014/0352459 A1 | 12/2014 | Matsuzawa et al. | | |

FOREIGN PATENT DOCUMENTS

| | | | | |
|---|---|---|---|---|
| EP | 2824824 A1 * | 1/2015 | ........... | H02N 2/0015 |
| GB | 2381376 A | 4/2003 | | |
| JP | 01-190272 A | 7/1989 | | |
| JP | 11-047690 A | 2/1999 | | |
| JP | H11-143542 A | 5/1999 | | |
| JP | 2002-035696 A | 2/2002 | | |
| JP | 2004-251122 A | 9/2004 | | |
| JP | 2004-254353 A | 9/2004 | | |
| JP | 2004-260990 A | 9/2004 | | |
| JP | 2004-320979 A | 11/2004 | | |
| JP | 2006-158051 A | 6/2006 | | |
| JP | 2010-259193 A | 11/2010 | | |
| JP | 2011-234608 A | 11/2011 | | |
| JP | 2014-075955 A | 4/2014 | | |
| JP | 2014-209819 A | 11/2014 | | |
| WO | WO-2010-113505 A1 | 10/2010 | | |

OTHER PUBLICATIONS

Extended European Search Report for Patent Application No. EP16158225.9 dated Jul. 20, 2016 (8 pages).

* cited by examiner

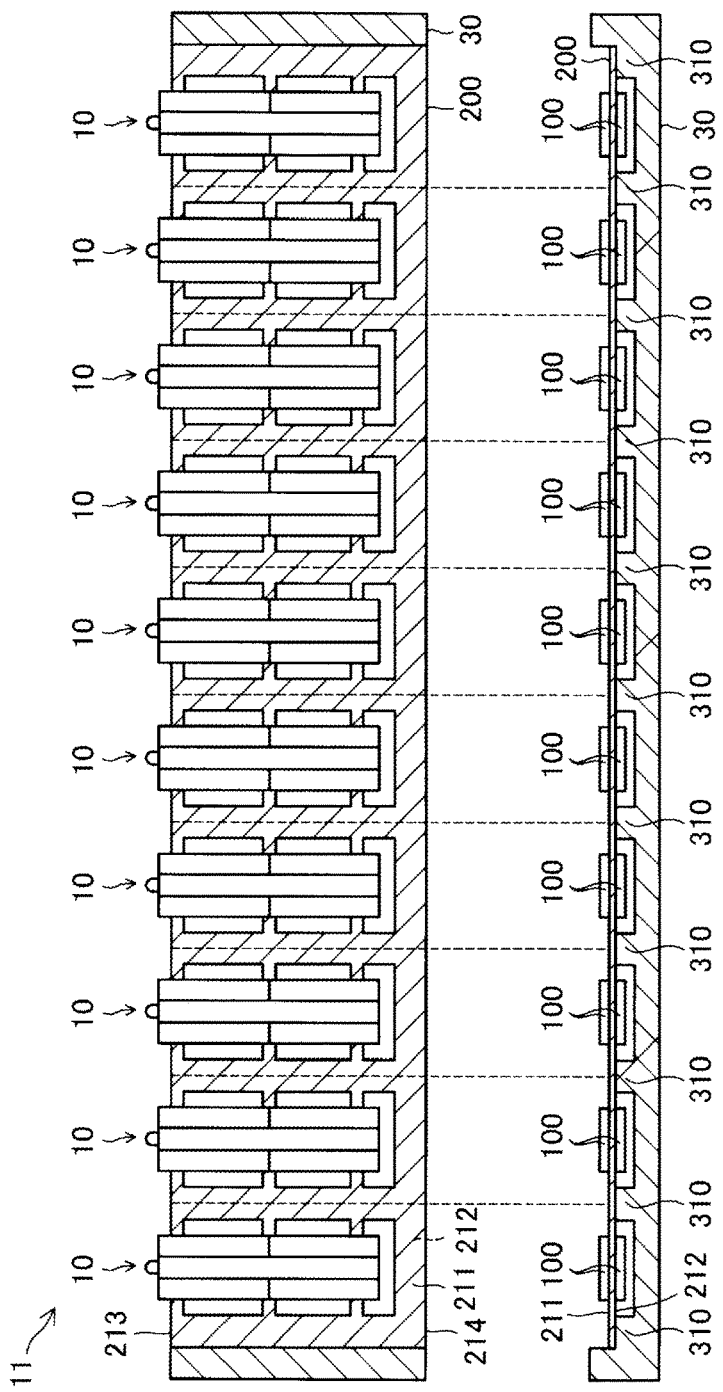

| TYPE | DIMENSIONS OF PIEZOELECTRIC SUBSTANCE L × W × H [mm] | THICKNESS OF VIBRATING PLATE [mm] | TOTAL THICKNESS [mm] | WEIGHT Wt [kg] | OUTPUT Pw [W] | APPLICATION VOLTAGE [V] | Pw/Wt [W/kg] | REMARKS |
|---|---|---|---|---|---|---|---|---|
| S1 | 30 × 8 × 1.0 | 0.5 | 2.5 | $4.68 \times 10^{-3}$ | 0.974 | 180 | $2.081 \times 10^{2}$ | BULK |
| S2 | 9 × 2.4 × 0.3 | 0.1 | 0.7 | $1.18 \times 10^{-4}$ | 0.097 | 72 | $8.818 \times 10^{2}$ | BULK |
| S3 | 3.5 × 1 × 0.15 | 0.1 | 0.4 | $1.1 \times 10^{-5}$ | 0.030 | 63 | $2.727 \times 10^{3}$ | BULK |
| S4 | 1.5 × 0.429 × 0.15 | 0.1 | 0.4 | $2 \times 10^{-6}$ | 0.026 | 63 | $1.3 \times 10^{4}$ | BULK |
| S5 | 3.5 × 1 × 0.002 | 0.06 | 0.064 | $5.22 \times 10^{-7}$ | 0.032 | 20 | $6.130 \times 10^{4}$ | THIN FILM |
| S6 | 0.2 × 0.057 × 0.002 | 0.06 | 0.064 | $1.70 \times 10^{-9}$ | $1.815 \times 10^{-3}$ | 20 | $1.067 \times 10^{6}$ | THIN FILM |

FIG. 8

| TYPE | 0.3 W | 1 W | 3 W | 10 W | 30 W | 100 W |
|---|---|---|---|---|---|---|
| S1 | — | — | — | 11 DEVICES | 31 DEVICES | 103 DEVICES |
| S2 | — | 11 DEVICES | 31 DEVICES | 104 DEVICES | 310 DEVICES | 1031 DEVICES |
| S3 | 10 DEVICES | 34 DEVICES | 100 DEVICES | 334 DEVICES | 1000 DEVICES | 3334 DEVICES |
| S4 | 12 DEVICES | 39 DEVICES | 116 DEVICES | 385 DEVICES | 1154 DEVICES | 3847 DEVICES |
| S5 | 10 DEVICES | 32 DEVICES | 94 DEVICES | 313 DEVICES | 938 DEVICES | 3125 DEVICES |
| S6 | 166 DEVICES | 551 DEVICES | 1653 DEVICES | 5510 DEVICES | 16529 DEVICES | 55097 DEVICES |

FIG. 10

S110 ⬇ FORM INSULATING LAYER

S120 ⬇ FORM FIRST ELECTRODE

S130 ⬇ FORM PIEZOELECTRIC SUBSTANCE LAYER

S140 ⬇ FORM SECOND ELECTRODE

S150 ⬇ PERFORM PATTERNING ON SECOND ELECTRODE AND PIEZOELECTRIC SUBSTANCE

PIEZOELECTRIC DRIVE DEVICE AND ROBOT

BACKGROUND

1. Technical Field

The present invention relates to a piezoelectric drive device and various apparatuses such as a robot including a piezoelectric drive device.

2. Related Art

A piezoelectric actuator (piezoelectric drive device) which drives a driven body by vibrating a piezoelectric substance is used in various fields, since a magnet or a coil is not required (for example, JP-A-2004-320979). According to a basic configuration of the piezoelectric drive device, four piezoelectric elements are configured to be arranged in two rows and two columns on two surfaces of a reinforcing plate. Eight piezoelectric elements in total are disposed on both sides of the reinforcing plate. Each of the piezoelectric elements is a unit which interposes each piezoelectric substance between two electrodes. The reinforcing plate is used as one electrode of the piezoelectric element. One end of the reinforcing plate has a protrusion portion disposed in order to rotate a rotor by coming into contact with the rotor serving as a driven body. If an AC voltage is applied to the two piezoelectric elements arranged at opposite angles among the four piezoelectric elements, the two piezoelectric elements perform expansion and contraction movement. In response to the movement, the protrusion portion of the reinforcing plate performs reciprocating movement or elliptical movement. Then, in response to the reciprocating movement or the elliptical movement of the protrusion portion of the reinforcing plate, the rotor serving as the driven body is rotated in a predetermined rotation direction. The rotor can be rotated in the opposite direction by switching from the two piezoelectric elements to which the AC voltage is applied to the other two piezoelectric elements.

An output Pw of a piezoelectric drive device is proportional to the product of drive force F and drive speed v of the piezoelectric drive device. Here, the drive force F of the piezoelectric drive device is proportional to a cross-sectional area of a piezoelectric element (specifically, piezoelectric substance interposed between electrodes) configuring the piezoelectric drive device. Therefore, according to a dimensional analysis, if a length dimension representing a dimension of the piezoelectric element is indicated by [L], the drive force F is proportional to $[L]^2$. The drive speed v of the piezoelectric drive device is proportional to a length $[L]^1$ of the piezoelectric element, and a resonance frequency fr is proportional to $[L]^{-1}$. Accordingly, the drive speed v has no relationship with [L]. Therefore, it is considered that the output Pw of the piezoelectric drive device is proportional to $[L]^2$. The output Pw of the piezoelectric drive device can be increased simply by increasing the dimensions of the piezoelectric element configuring the piezoelectric drive device and increasing the volume of the piezoelectric element.

However, a weight Wt of the piezoelectric drive device is proportional to a volume $[L]^3$ of the piezoelectric element. Accordingly, a power-to-weight ratio Pw/Wt (ratio of the output Pw to the weight Wt) of the piezoelectric drive device becomes proportional to $[L]^{-1}$. Consequently, a problem arises in that simply increasing the dimension of the piezoelectric element and increasing the output Pw of the piezoelectric drive device may unreasonably cause a decrease in the power-to-weight ratio Pw/Wt. For this reason, a technology has been desired which can provide a lightweight piezoelectric drive device having high output while the decrease in the power-to-weight ratio Pw/Wt is prevented. In addition, for the piezoelectric drive device, miniaturization, low cost, resource saving, easy manufacturing, and improved usability have been desired.

SUMMARY

An advantage of some aspects of the invention is to solve at least a part of the problems described above, and the invention can be implemented as the following forms or application examples.

(1) An aspect of the invention is directed to a piezoelectric drive device. The piezoelectric drive device includes multiple piezoelectric drive units that have a contact portion which can come into contact with a driven portion, and that have a piezoelectric substance. The number of the multiple piezoelectric drive units is 10 or more, an overall output from the multiple piezoelectric drive units is 0.3 W or greater, and a weight of the piezoelectric drive unit is 1 μg to 5 g.

According to this aspect, the piezoelectric drive device is configured to include 10 or more of lightweight piezoelectric drive units whose weight is 1 μg to 5 g. In this manner, it is possible to realize a lightweight piezoelectric drive device in which an overall output of the piezoelectric drive device can be increased up to a high output of 0.3 W or greater, while a power-to-weight ratio can be maintained so as to be equal to a power-to-weight ratio obtained when one piezoelectric drive unit is used.

(2) In the piezoelectric drive device, the piezoelectric drive unit may satisfy the following expression:

$$\log_{10}(Pw/Wt) \geq -0.373 \cdot \log_{10}(Wt) + 1.448.$$

Here, Wt represents a weight [kg] of the piezoelectric drive unit, Pw represents an output [W] of the piezoelectric drive unit, and Pw/Wt represents a power-to-weight ratio [W/kg] of the piezoelectric drive unit.

According to this aspect, the piezoelectric drive device can be configured to include a further miniaturized and more lightweight piezoelectric drive unit which has a high power-to-weight ratio. Therefore, it is possible to realize a lightweight piezoelectric drive device in which the overall output of the piezoelectric drive device can be increased up to a high output of 0.3 W or greater, while the higher power-to-weight ratio can be maintained.

(3) In the piezoelectric drive device, the piezoelectric drive unit may satisfy the following expression:

$$\log_{10}(Pw/Wt) \geq -0.498 \cdot \log_{10}(Wt) + 1.653.$$

According to this configuration, the piezoelectric drive device can be configured to include a more lightweight piezoelectric drive unit which has a much high power-to-weight ratio. Therefore, it is possible to realize a lightweight piezoelectric drive device in which the overall output of the piezoelectric drive device can be increased up to a high output of 0.3 W or greater, while the higher power-to-weight ratio can be maintained.

(4) In the piezoelectric drive device, the output of the piezoelectric drive unit may be 0.001 W to 1 W.

According to this configuration, 10 or more of lightweight piezoelectric drive units whose output is 0.001 W to 1 W are used. In this manner, the piezoelectric drive device can be configured to include a miniaturized and lightweight piezoelectric drive unit which has a high power-to-weight ratio. Therefore, it is possible to realize a lightweight piezoelectric drive device in which the overall output of the piezoelectric drive device can be increased up to a high output of 0.3 W or greater, while the high power-to-weight ratio can be maintained.

(5) In the piezoelectric drive device, a thickness of the piezoelectric substance may be 0.05 µm to 20 µm.

Even in this aspect, 10 or more of miniaturized and lightweight piezoelectric drive units whose thickness is entirely thinned down to 0.05 µm to 20 µm are used. In this manner, the piezoelectric drive device can be configured to include a miniaturized and lightweight piezoelectric drive unit which has a high power-to-weight ratio. Therefore, it is possible to realize a lightweight piezoelectric drive device in which the overall output of the piezoelectric drive device can be increased up to a high output of 0.3 W or greater, while the high power-to-weight ratio can be maintained.

(6) In the piezoelectric drive device, the weight of each one of the piezoelectric drive units may be 1 µg to 100 mg.

Even in this aspect, 10 or more of lightweight piezoelectric drive units whose weight is 1 µg to 100 mg are used. In this manner, the piezoelectric drive device can be configured to include a miniaturized and lightweight piezoelectric drive unit which has a high power-to-weight ratio. Therefore, it is possible to realize a lightweight piezoelectric drive device in which the overall output of the piezoelectric drive device can be increased up to a high output of 0.3 W or greater, while the high power-to-weight ratio can be maintained.

(7) In the piezoelectric drive device, the number of the multiple piezoelectric drive units may be 100 or more.

According to this configuration, the piezoelectric drive device can be configured to include 100 or more of miniaturized and lightweight piezoelectric drive units which have a high power-to-weight ratio. Therefore, compared to a case of using 10 piezoelectric drive units, it is possible to further realize a lightweight piezoelectric drive device in which the overall output of the piezoelectric drive device can be increased up to a high output of 3 W or greater, while the higher power-to-weight ratio can be maintained.

(8) In the piezoelectric drive device, the number of the multiple piezoelectric drive units may be 1,000 or more.

According to this configuration, the piezoelectric drive device can be configured to include 1,000 or more of miniaturized and lightweight piezoelectric drive units which have a high power-to-weight ratio. Therefore, compared to a case of using 100 piezoelectric drive units, it is possible to further realize a lightweight piezoelectric drive device in which the overall output of the piezoelectric drive device can be increased up to a high output of 30 W or greater, while the higher power-to-weight ratio can be maintained.

(9) In the piezoelectric drive device, the piezoelectric vibrating body may have a substrate, a first electrode which is arranged in the substrate, the piezoelectric substance which is arranged in the first electrode, and a second electrode which is arranged in the piezoelectric substance.

According to this configuration, a piezoelectric vibrating body can be configured to be miniaturized and lightweight, and a lightweight piezoelectric drive unit which has a high power-to-weight ratio can be configured. Therefore, it is possible to easily realize a lightweight piezoelectric drive device in which the overall output of the piezoelectric drive device can be increased up to a high output of 0.3 W or greater, while the high power-to-weight ratio can be maintained.

The invention can be implemented in various forms. For example, in addition to the piezoelectric drive device, the invention can be implemented in various forms such as a drive method of the piezoelectric drive device, a manufacturing method of the piezoelectric drive device, a robot having the piezoelectric drive device mounted thereon, a drive method of the robot having the piezoelectric drive device mounted thereon, a liquid feeding pump, a medication pump, and the like.

BRIEF DESCRIPTION OF THE DRAWINGS

The invention will be described with reference to the accompanying drawings, wherein like numbers reference like elements.

FIGS. 1A and 1B are schematic configuration diagrams illustrating an example of a piezoelectric drive device which employs 10 piezoelectric drive units according to an embodiment of the invention.

FIG. 8 is a table illustrating an example of a single body piezoelectric drive device which can be employed as the piezoelectric drive unit.

FIG. 10 is a table illustrating an example of the number of single body piezoelectric drive devices required when the piezoelectric drive device is configured to include the respective single body piezoelectric drive devices illustrated in FIG. 8.

DESCRIPTION OF EXEMPLARY EMBODIMENTS

A. Embodiment

Figure 2A:
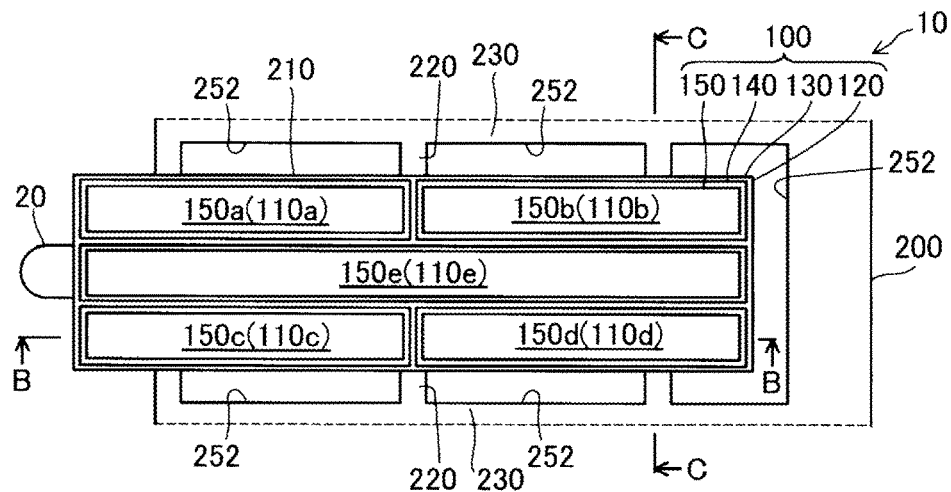
FIGS. 2A to 2C are schematic configuration diagrams of the piezoelectric drive unit illustrated in FIGS. 1A and 1B.

FIGS. 1A and 1B are schematic configuration diagrams illustrating an example of a piezoelectric drive device which employs 10 piezoelectric drive units according to an embodiment of the invention. FIG. 1A is a plan view of a piezoelectric drive device 11, and FIG. 1B is a side view thereof. The piezoelectric drive device 11 includes a vibrating plate 200 and 10 piezoelectric drive units 10 arranged in the vibrating plate 200. The vibrating plate 200 having the piezoelectric drive units 10 arranged therein is supported by and fixed to each support portion 310 of a support body 30. The piezoelectric drive unit 10 includes two piezoelectric vibrating bodies 100 which are respectively arranged on both surfaces of the vibrating plate 200. In FIGS. 1A and 1B, for convenience of illustration, the vibrating plate 200 and the support body 30 are hatched.

Figure 2B:
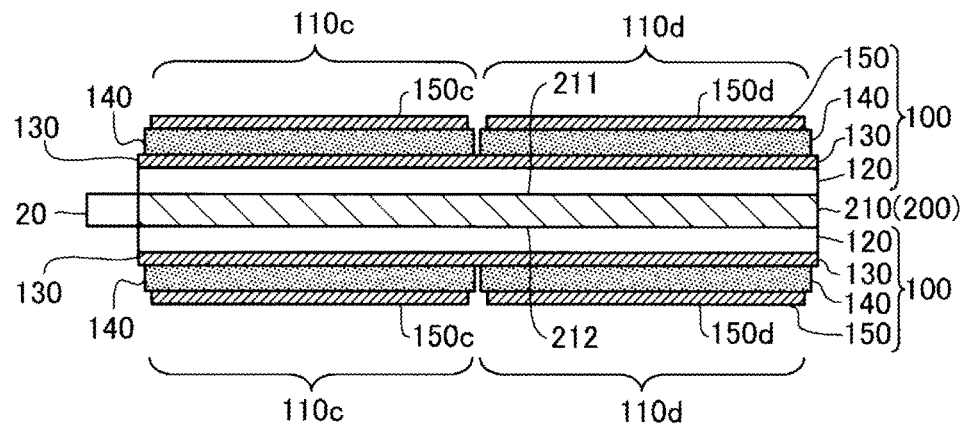
Figure 2C:
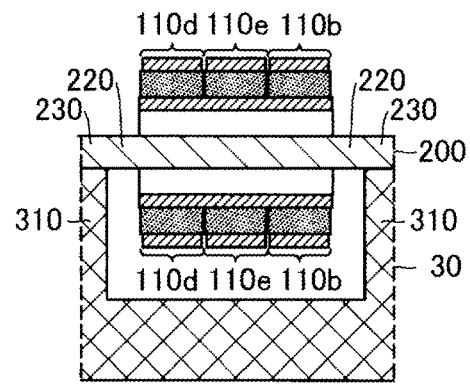

FIGS. 2A to 2C are schematic configuration diagrams of the piezoelectric drive unit 10 illustrated in FIGS. 1A and 1B. FIG. 2A is a plan view of the piezoelectric drive unit 10, FIG. 2B is a sectional view taken along line B-B in FIG. 2A, and FIG. 2C is a sectional view taken along line C-C in FIG. 2A. As described above, the piezoelectric drive unit 10 includes a vibrating body portion 210 of the vibrating plate 200, and two piezoelectric vibrating bodies 100 which are respectively arranged on both surfaces (a first surface 211 (also referred to as a "front surface" or an "upper surface") and a second surface 212 (also referred to as a "rear surface" or a "lower surface")) of the vibrating body portion 210. The piezoelectric vibrating body 100 includes a substrate 120, a first electrode 130 which is disposed on the substrate 120, a piezoelectric substance 140 which is disposed on the first electrode 130, and a second electrode 150 which is disposed on the piezoelectric substance 140. The first electrode 130 and the second electrode 150 interpose the piezoelectric substance 140 therebetween. The two piezoelectric vibrating bodies 100 are arranged symmetrical to each other around the vibrating body portion 210 of the vibrating plate 200. The two piezoelectric vibrating bodies 100 have the same configuration as each other. Thus, unless otherwise specified in the following, a configuration of the piezoelectric vibrating body 100 located on an upper side of the vibrating plate 200 will be described.

The substrate 120 of the piezoelectric vibrating body 100 is used as a substrate for forming the first electrode 130, the piezoelectric substance 140, and the second electrode 150. The substrate 120 also has a function as a vibrating plate for mechanical vibrating. For example, the substrate 120 can be formed of Si, $Al_2O_3$, $ZrO_2$, and $SiO_2$.

The first electrode 130 is formed as one continuous conductive layer which is formed on a surface on the substrate 120 side of the piezoelectric substance 140. In contrast, as illustrated in FIG. 2A, the second electrode 150 is divided into five conductive layers 150a to 150e (also referred to as "second electrodes 150a to 150e"). The second electrode 150e located in the center is formed in a rectangular shape extending over substantially the whole body in the longitudinal direction of the substrate 120, in the center in the width direction of the substrate 120. The other four second electrodes 150a, 150b, 150c, and 150d have the same planar shape, and are formed at positions of four corners of the substrate 120. In an example illustrated in FIGS. 2A to 2C, both the first electrode 130 and the second electrode 150 have a rectangular planar shape.

For example, the first electrode 130 or the second electrode 150 is a thin film formed by means of sputtering or vacuum deposition. For example, as a material of the first electrode 130 or the second electrode 150, it is possible to use any highly conductive material such as Aluminum (Al), nickel (Ni), gold (Au), platinum (Pt), iridium (Ir), and copper (Cu). Instead of configuring the first electrode 130 to include one continuous conductive layer, the first electrode 130 may be divided into five conductive layers having substantially the same planar shape as that of the second electrodes 150a to 150e. Wiring (or a wiring layer and an insulating layer) for electrical connection between the second electrodes 150a to 150e, and wiring (or a wiring layer and an insulating layer) for electrical connection between the first electrode 130 and the second electrodes 150a to 150e and a drive circuit are omitted in the illustration in FIGS. 2A to 2C.

The piezoelectric substance 140 is formed as five piezoelectric substance layers having substantially the same planar shape as that of the second electrodes 150a to 150e. Alternatively, the piezoelectric substance 140 may be formed as one continuous piezoelectric substance layer having substantially the same planar shape as that of the first electrode 130. Five piezoelectric elements 110a to 110e (refer to FIG. 2A) are configured to include a layered structure of the first electrode 130, the piezoelectric substance 140, and the second electrodes 150a to 150e.

As will be described later, the piezoelectric substance 140 is formed using a bulk forming process, or is formed using a sol-gel method or a sputtering method. As a material of the piezoelectric substance 140, it is possible to use any material which shows a piezoelectric effect, such as ceramics employing a Perovskite structure of $ABO_3$ type. For example, as the ceramics employing the Perovskite structure of $ABO_3$ type, it is possible to use lead zirconate titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, scandium lead niobate, and the like. For example, in addition to the ceramic, it is also possible to use a material which shows a piezoelectric effect, such as polyvinylidene fluoride, a crystal, and the like.

Figure 3:
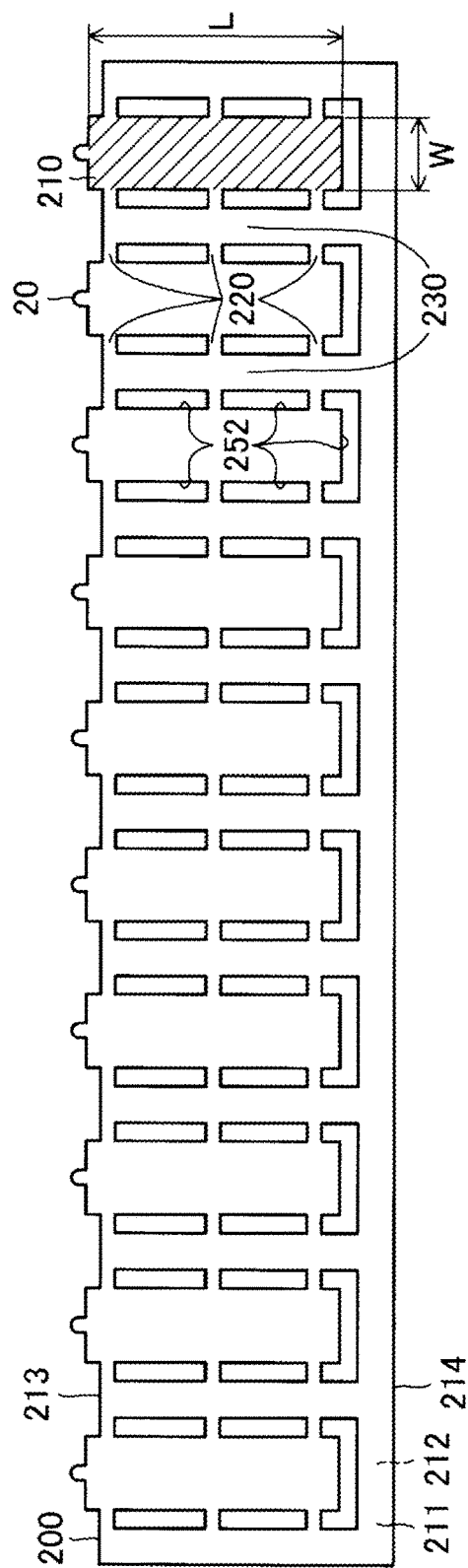
FIG. 3 is a plan view of a vibrating plate.

FIG. 3 is a plan view of the vibrating plate 200. The vibrating plate 200 has 10 rectangular vibrating body portions 210 which are formed of multiple through-holes 252, connection portions 220 which respectively triply extend from the right and left long sides of the vibrating body portion 210, and two fixing portions 230 which are respectively connected to the right and left three connection portions 220. However, in the two adjacent vibrating body portions 210, the right side connection portion 220 of the left side vibrating body portion 210 and the left side connection portion 220 of the right side vibrating body portion 210 are connected to the fixing portion 230 in common. In FIG. 3, for convenience of illustration, the vibrating body portion 210 is hatched. The fixing portion 230 is used in order to fix the piezoelectric drive device 11 to the support body 30 by using an adhesive. For example, the vibrating plate 200 can be formed of a metal material such as stainless steel, aluminum, aluminum alloy, titanium, titanium alloy, copper, copper alloy, iron-nickel alloy, and the like. In addition, the vibrating plate 200 can also be formed of a metal oxide material such as zirconia, titania, alumina, zinc oxide, and the like. In addition, the vibrating plate 200 can also be formed of ceramics, for example, Si, SiO2, SiC, $Al_2O_3$, $ZrO_2$, and the like, or can also be formed of diamond.

The piezoelectric vibrating bodies 100 (refer to FIGS. 2A to 2C) respectively adhere to an upper surface (first surface) and a lower surface (second surface) of the vibrating body portion 210 by using an adhesive. In general, a length L and a width W of the vibrating body portion 210 are formed so as to coincide with a length and a width of the piezoelectric vibrating body 100. Preferably, a ratio between the length L and the width W of the vibrating body portion 210 is set to L:W=approximately 7:2. The ratio is a preferred value used in order to perform ultrasonic vibrations (to be described later) in which the vibrating body portion 210 is bent to the right and left along its plane by the piezoelectric vibrating body 100.

For example, the length L of the vibrating body portion 210 can be set to a range of 0.1 mm to 30 mm. For example, the width W can be set to a range of 0.02 mm to 9 mm. Preferably, the length L is set to 50 mm or smaller in order for the vibrating body portion 210 to perform the ultrasonic vibrations. For example, the thickness (thickness of the vibrating plate 200) of the vibrating body portion 210 can be set to a range of 20 μm to 800 μm. If the thickness of the vibrating body portion 210 is set to 20 μm or greater, the vibrating body portion 210 has sufficient rigidity in order to support the piezoelectric vibrating body 100. If the thickness of the vibrating body portion 210 is set to 800 μm or smaller, the vibrating body portion 210 is enabled to have sufficiently large deformation in response to deformation of the piezoelectric vibrating body 100.

A protrusion portion 20 (also referred to as a "contact portion" or an "operation portion") corresponding to the respective piezoelectric drive units 10 is integrally disposed on one third surface 213 interposed between the first surface 211 and the second surface 212 of the vibrating plate 200. The protrusion portion 20 is a member which comes into contact with and slides on a driven body (not illustrated, also referred to as a "driven portion") so as to apply force to the driven body. The protrusion portion 20 is formed integrally with the vibrating plate 200 by using the same member. However, without being limited to this configuration, the protrusion portion 20 may be integrally disposed by using another member and by adhering to the third surface 213 of the vibrating plate 200 using an adhesive. Preferably, the protrusion portion 20 is formed of a durable material such as ceramics (for example, Si, SiC, $Al_2O_3$, and $ZrO_2$).

As illustrated in FIG. 2C, the fixing portion 230 of the vibrating plate 200 is fixed by adhering to the support portion 310 of the support body 30 by using an adhesive. In this manner, the vibrating body portion 210 to which the piezoelectric vibrating body 100 is fixed, that is, the piezoelectric drive unit 10 is supported by the right and left support portions 310 so as to be capable of vibrating.

Figure 4:
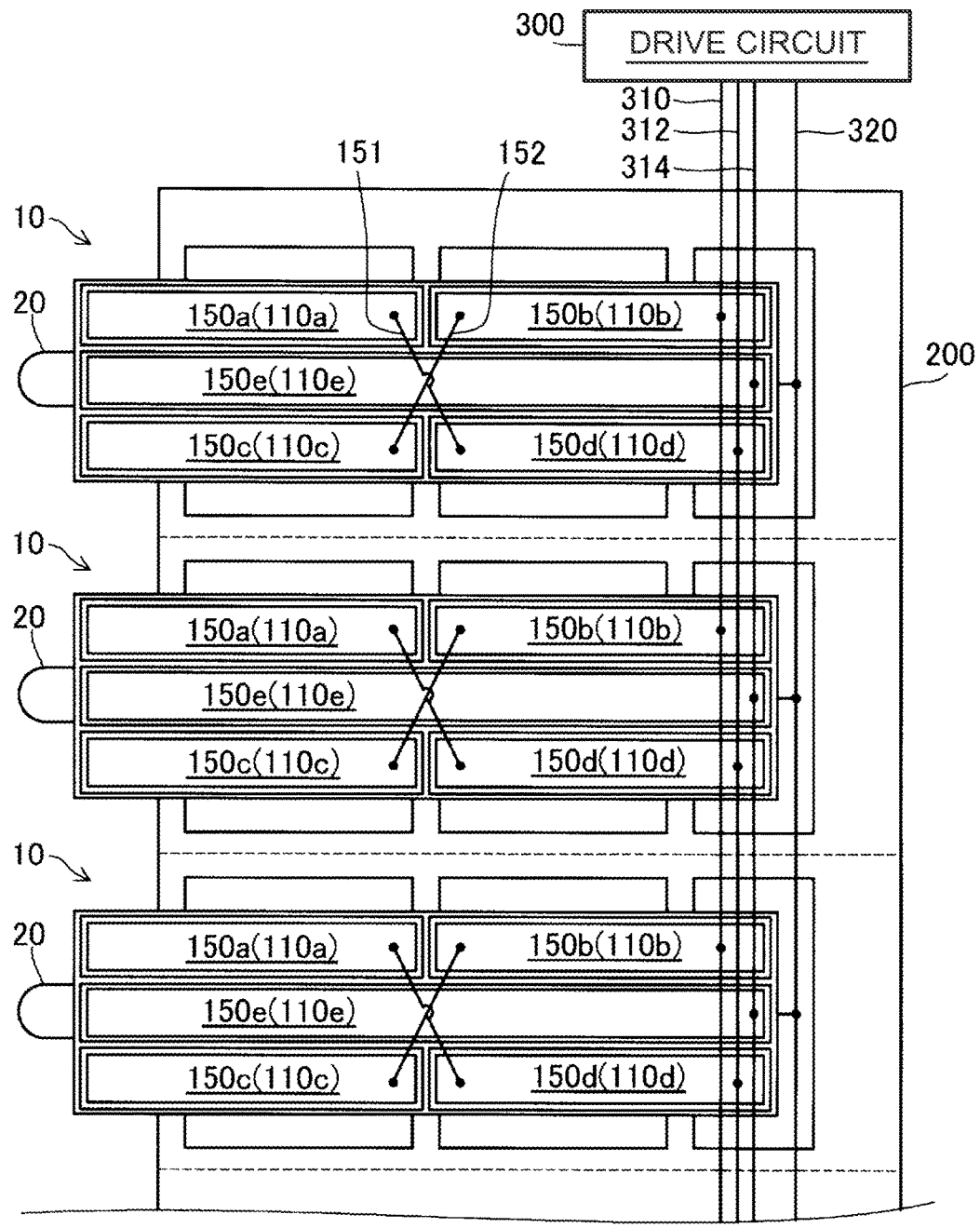
FIG. 4 is a view for describing an electrical connection state between each piezoelectric drive unit and a drive circuit.

FIG. 4 is a view for describing an electrical connection state between the respective piezoelectric drive units 10 and a drive circuit 300. In the respective piezoelectric drive units 10, among five second electrodes 150a to 150e of the piezoelectric vibrating body 100, a pair of the second electrodes 150a and 150d which are located at opposite angles are electrically connected to each other via a wire 151, and a pair of the second electrodes 150b and 150c which are located at the other opposite angles are also electrically connected to each other via a wire 152. The wires 151 and 152 may be formed using a film forming process, or may be implemented by means of wire-shaped wiring. The three second electrodes 150b, 150d, and 150e of the respective piezoelectric drive units 10 located on the right side in FIG. 4 and the first electrode 130 (refer to FIGS. 2A to 2C) are electrically connected to the drive circuit 300 via wires 310, 312, 314, and 320. The drive circuit 300 commonly applies a cyclically varying AC voltage or pulsating voltage between a pair of the second electrodes 150a and 150d and the first electrode 130 in the respective piezoelectric drive units 10. In this manner, the respective piezoelectric drive units 10 are caused to similarly perform ultrasonic vibrations, thereby enabling a driven body coming into contact with the protrusion portion 20 to be driven. For example, when the driven body is a rotor, the rotor can be rotated in a predetermined rotation direction around the center of the rotor. In addition, when the driven body is a moving body which is movable in a predetermined direction, the moving body can be rotated in the predetermined direction. Here, the "pulsating voltage" means a voltage obtained by adding a DC offset to the AC voltage. A direction of the voltage (electric field) is one direction from one electrode toward the other electrode. The rotor which serves as the driven body and which comes into contact with the protrusion portion 20 can be rotated in the opposite direction by commonly applying the AC voltage or the pulsating voltage between the other pair of the second electrodes 150b and 150c and the first electrode 130 in the respective piezoelectric drive units 10. The moving body serving as the driven body can be moved in the opposite direction. In addition, an AC voltage or a pulsating voltage whose phases are deviated from each other by 180 degrees can be applied between a pair of the second electrodes 150a and 150d and the first electrode 130 in the respective piezoelectric drive units 10, and between the other pair of the second electrodes 150b and 150c and the first electrode 130 in the respective piezoelectric drive units 10. In this case, the phases are adjusted for the AC voltage or the pulsating voltage whose phases are deviated from each other by 180 degrees, and the AC voltage or the pulsating voltage whose phases are adjusted is applied between one second electrode 150e and the first electrode 130 in the respective piezoelectric drive units 10. In this manner, it is possible to change the rotation direction or the movement direction of the driven body in response to the adjusted phase. The voltage is simultaneously applied in the two piezoelectric vibrating bodies 100 disposed on both surfaces of the vibrating body portion 210. Wiring (or a wiring layer and an insulating layer) configuring the wires 151, 152, 310, 312, 314, and 320 illustrated in FIG. 4 is omitted in the illustration in FIGS. 2A to 2C.

Figure 5:
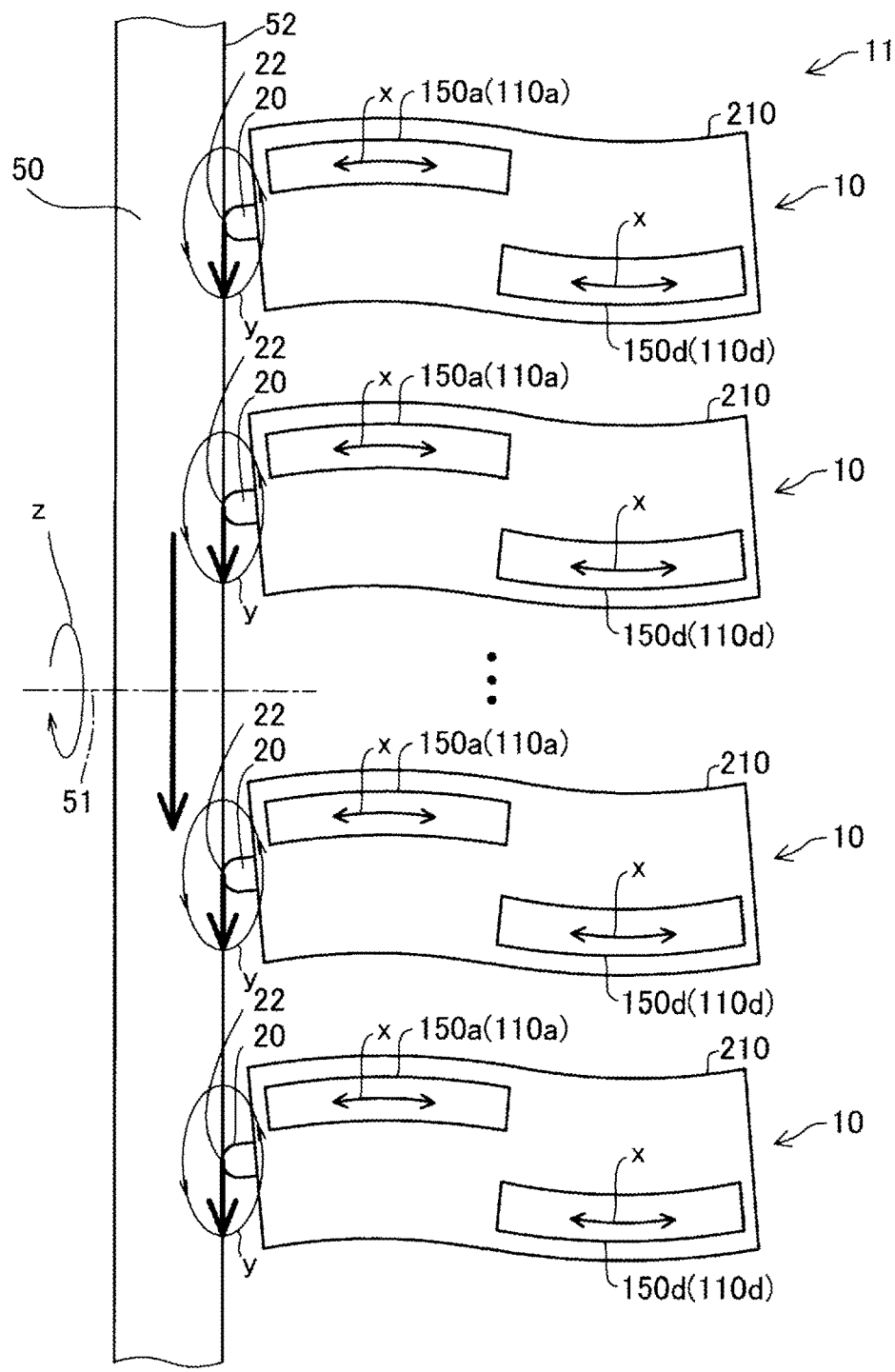
FIG. 5 is a view for describing an operation example of the piezoelectric drive device.

FIG. 5 is a view for describing an operation example of the piezoelectric drive device 11. FIG. 5 omits the illustration of the vibrating plate 200. The protrusion portion 20 of the respective piezoelectric drive units 10 is in contact with an outer peripheral side of a rotation surface (surface facing in a direction perpendicular to the paper surface) 52 perpendicular to a center 51 of a rotor 50 serving as the driven body. In the example illustrated in FIG. 5, the drive circuit 300 (refer to FIG. 4) applies the AC voltage or the pulsating voltage between a pair of the second electrodes 150a and 150d and the first electrode 130 in the respective piezoelectric drive units 10. The piezoelectric elements 110a and 110d expand and contract in a direction of an arrow x in FIG. 4. In response to this expansion and contraction, the vibrating body portion 210 of the respective piezoelectric drive units 10 is deformed into a meandering shape (S-shape) which is bent inside a plane of the vibrating body portion 210. In this manner, a distal end 22 of the protrusion portion 20 of the respective piezoelectric drive units 10 performs elliptical movement in a direction of an arrow y, based on a reciprocating movement component in a direction parallel to a rotation surface 52 of the rotor 50 (hereinafter, referred to as "bending vibrations") and a reciprocating movement component in a direction perpendicular to the rotation surface 52 (hereinafter, referred to as "longitudinal vibrations"). In this case, while the protrusion portion 20 is in contact with the rotation surface 52, the respective piezoelectric drive units 10 cause the rotation surface 52 to slide in a direction illustrated by a thick arrow, in response to a frictional force generated based on the force applied to the rotation surface 52 from the protrusion portion 20. As a result, the rotor 50 is rotated in a predetermined direction z (in FIG. 4, counterclockwise direction when viewed from the piezoelectric drive unit 10 side) around the center 51 of the rotor 50, in response to the total sum of the forces applied from the respective piezoelectric drive units 10. The three connection portions 220 of the vibrating plate 200 described with reference to FIG. 3 are disposed at a position of a vibration knot (joint) of the vibrating body portion 210 described above. When the drive circuit 300 applies the AC voltage or the pulsating voltage between the other pair of the second electrodes 150b and 150c and the first electrode 130, the distal end 22 of the protrusion portion 20 performs the elliptical movement in the opposite direction, and the rotor 50 is rotated in the opposite direction. If the same voltage as that of a pair of the second electrodes 150a and 150d (or the other pair of the second electrodes 150b and 150c) is applied to the second electrode 150e in the center, the piezoelectric drive unit 10 expands or contracts in the longitudinal direction. Accordingly, it is possible to further increase the force applied from the protrusion portion 20 to the rotor 50. This operation of the piezoelectric drive unit 10 (or the piezoelectric vibrating body 100) is disclosed in Patent Document 1 described above (JP-A-2004-320979 or corresponding U.S. Pat. No. 7,224,102), the content of which is incorporated by reference.

As described above, the piezoelectric drive device 11 according to the embodiment has a structure in which the 10 piezoelectric vibrating bodies 100 are arranged in one row on the first surface 211 of the vibrating plate 200, in which the 10 piezoelectric vibrating bodies 100 are arranged in one row on the second surface 212 so as to be paired therewith, and in which the 10 piezoelectric drive units 10 configured to include a pair of the upper and lower piezoelectric vibrating bodies 100 are arranged in one row in the vibrating plate 200. However, without being limited thereto, the piezoelectric drive unit 10 may be configured to include only any one of the piezoelectric vibrating bodies 100.

Figure 6:
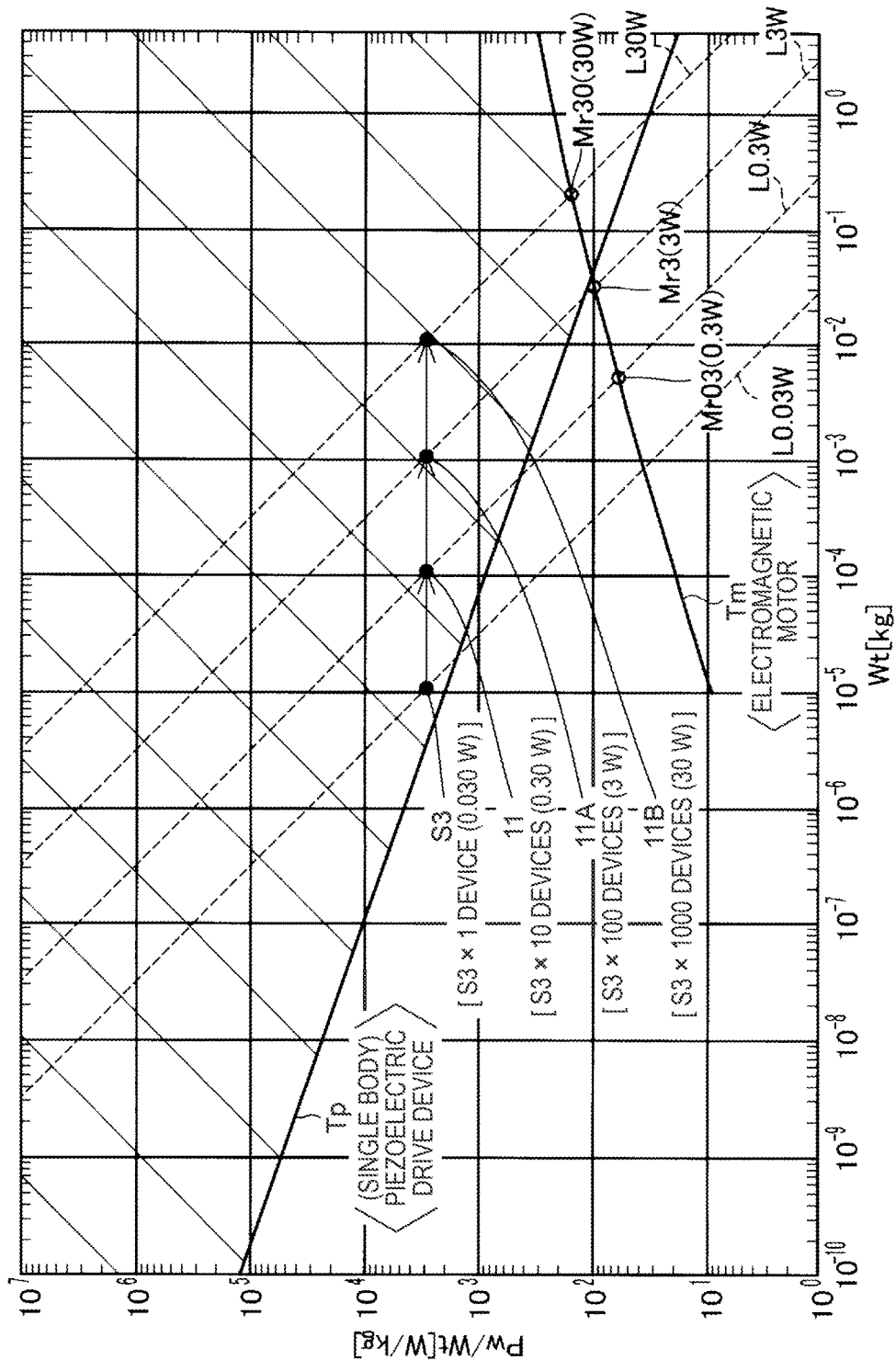
FIG. 6 is a graph illustrating a relationship between the weight and a power-to-weight ratio of the piezoelectric drive device.

FIG. 6 is a graph illustrating a relationship between a weight and a power-to-weight ratio of the piezoelectric drive device 11, and illustrates a double-logarithmic graph in which the horizontal axis represents a weight Wt [kg] of the drive device and the vertical axis represents a power-to-weight ratio Pw/Wt [W/kg]. A curve Tm tilting obliquely upward to the right indicates a representative characteristic in the power-to-weight ratio Pw/Wt with respect to the weight Wt of an electromagnetic motor which is generally used as the drive device. A straight line Tp tilting downward obliquely downward to the right indicates a design characteristic of the power-to-weight ratio Pw/Wt with respect to the weight Wt of the piezoelectric drive device (piezoelectric actuator) which has one piezoelectric drive unit. Hereinafter, in order to distinguish the piezoelectric drive device having one piezoelectric drive unit from the piezoelectric drive device having multiple piezoelectric drive units, the piezoelectric drive device having one piezoelectric drive unit is also referred to as a "single body piezoelectric drive device". Respective lines L0.03 W, L0.3 W, L3 W, and L30 W illustrated by straight broken lines indicate theoretical values of the power-to-weight ratio Pw/Wt and the weight Wt which respectively correspond to the output Pw of 0.03 W, 0.3 W, 3 W, and 30 W. Intersection points Mr03, Mr3, and Mr30 between the characteristic Tm of the electromagnetic motor and the respective lines L0.3 W, L3 W, and L30 W respectively indicate positions of the power-to-weight ratio Pw/Wt and the weight Wt when the output Pw of the electromagnetic motor is 0.3 W, 3 W, and 30 W.

The characteristic Tm of the electromagnetic motor indicates a characteristic in which the power-to-weight ratio Pw/Wt increases in accordance with an increase in the weight Wt which is caused by increased dimensions. In contrast, as described above, the characteristic Tp of the single body piezoelectric drive device indicates a characteristic in which the power-to-weight ratio Pw/Wt decreases in accordance with the increase in the weight Wt which is caused by increased dimensions. Therefore, in a case of the single body piezoelectric drive device, even if the output Pw is increased by increasing the dimensions of the piezoelectric vibrating body configuring the piezoelectric drive unit, the increased weight Wt decreases the power-to-weight ratio Pw/Wt. For this reason, in the single body piezoelectric drive device, increasing the dimensions and increasing the output Pw are not reasonable from a viewpoint of the power-to-weight ratio Pw/Wt. The single body piezoelectric drive device cannot be superior to the electromagnetic motor in a region equal to or greater than the weight Wt in which the power-to-weight ratio Pw/Wt of the characteristic Tm of the electromagnetic motor becomes higher than the power-to-weight ratio Pw/Wt of the characteristic Tp of the piezoelectric drive device. In order for the single body piezoelectric drive device or the piezoelectric drive device to be equal to or superior to the electromagnetic motor from the viewpoint of the power-to-weight ratio Pw/Wt, it is desirable that at least the power-to-weight ratio Pw/Wt of the single body piezoelectric drive device or the piezoelectric drive device falls within a hatched region in FIG. 6 (region equal to or over both the straight line Tp and the curve Tm). Therefore, hereinafter, the characteristic Tp of the single body piezoelectric drive device is also referred to as a "boundary characteristic Tp of the piezoelectric drive device.

Here, as will be understood from the boundary characteristic Tp of the piezoelectric drive device, if the weight Wt of the piezoelectric drive device (single body piezoelectric drive device) further decreases, the power-to-weight ratio Pw/Wt further increases. Therefore, this point is focused on so that the piezoelectric drive device is configured to include multiple (for example, 10 or more) miniaturized piezoelectric drive devices whose weights Wt are light. In this manner, based on simple calculation, it is considered that it is possible to configure the piezoelectric drive device having high output while the power-to-weight ratio Pw/Wt which is the same as that of one piezoelectric drive device (single body piezoelectric drive device) can be maintained.

In FIG. 6, a single body piezoelectric drive device S3 is configured so that the weight Wt is $1.1 \times 10^{-5}$ kg, the output Pw is 0.03 W, and the power-to-weight ratio Pw/Wt is $2.727 \times 10^3$ W/kg, and corresponds to one piezoelectric drive unit 10 in FIGS. 1A and 1B. The piezoelectric drive device 11 illustrated in FIGS. 1A and 1B is configured so that 10 piezoelectric drive units 10 (=single body piezoelectric drive devices S3) are arranged therein.

As illustrated in FIG. 6, in the piezoelectric drive device 11, the weight Wt is $1.1 \times 10^{-4}$ kg which is ten times that of the single body piezoelectric drive device S3, and the output Pw is 0.3 W which is also ten times. That is, based on simple calculation, in the piezoelectric drive device 11, the output Pw can be increased up to 0.3 W which is ten times, while the power-to-weight ratio Pw/Wt is maintained to be 2.727× $10^3$ W/kg which is the same as that of one piezoelectric drive unit 10. Therefore, the piezoelectric drive device 11 is configured so that the power-to-weight ratio Pw/Wt becomes higher and the weight Wt becomes lighter than those of an electromagnetic motor Mr03 whose output Pw is 0.3 W.

If 100 single body piezoelectric drive devices S3 are used, as illustrated in FIG. 6, it is possible to configure a piezoelectric drive device 11A whose output Pw is increased up to 3 W which is one hundred times, while the power-to-weight ratio Pw/Wt is maintained to be the same as that of one single body piezoelectric drive device S3. The piezoelectric drive device 11A can also be configured so that the power-to-weight ratio Pw/Wt becomes higher and the weight Wt becomes lighter than those of an electromagnetic motor Mr3 whose output Pw is 3 W.

If 1,000 single body piezoelectric drive devices S3 are used, as illustrated in FIG. 6, it is possible to configure a piezoelectric drive device 11B whose output Pw is increased up to 30 W which is one thousand times, while the power-to-weight ratio Pw/Wt is maintained to be the same as that of one single body piezoelectric drive device S3. The piezoelectric drive device 11B can also be configured so that the power-to-weight ratio Pw/Wt becomes higher and the weight Wt becomes lighter than those of an electromagnetic motor Mr30 whose output Pw is 30 W.

For example, the piezoelectric drive device 11A or the piezoelectric drive device 11B can be configured as follows.

Figure 7:
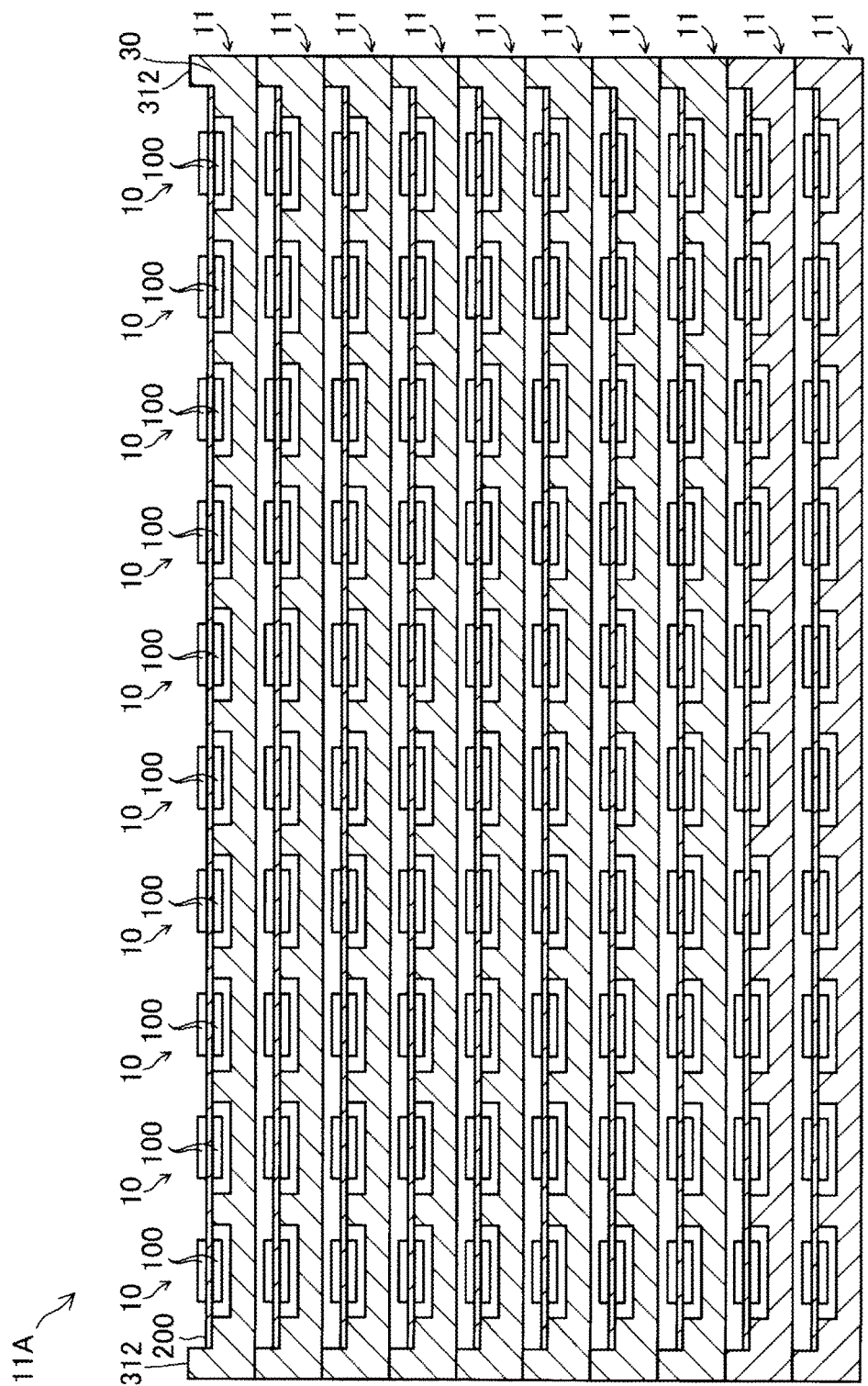
FIG. 7 is a side view illustrating an example of a schematic configuration of the piezoelectric drive device which employs 100 piezoelectric drive units.

FIG. 7 is a side view illustrating an example of a schematic configuration of a piezoelectric drive device which employs 100 piezoelectric drive units. Similarly to FIGS. 1A and 1B, for convenience of illustration, the vibrating plate 200 and the support body 30 are also hatched in FIG. 7. As illustrated in FIG. 7, the piezoelectric drive device 11 (refer to FIGS. 1A and 1B) is configured so as to be stacked in 10 layers along a direction perpendicular to a surface (first surface 211 and second surface 212) on which the piezoelectric drive unit 10 is arranged. In this manner, it is possible to configure the piezoelectric drive device 11A which employs the 100 piezoelectric drive units 10. That is, the piezoelectric drive device 11A has a configuration in which the vibrating plate 200 having the multiple piezoelectric vibrating bodies 100 arranged therein is stacked in 10 layers via the support body 30, along the direction perpendicular to the surface on which the piezoelectric vibrating body 100 is arranged. The respective piezoelectric drive devices 11 are fixed onto a support frame 312 disposed in the support body 30 of the piezoelectric drive device 11 located immediately below by using an adhesive.

Although not illustrated, similarly to the piezoelectric drive device 11A, the piezoelectric drive device 11 is configured to be stacked in 100 layers. In this manner, it is possible to configure the piezoelectric drive device 11B which employs 1,000 piezoelectric drive units 10.

An arrangement of the piezoelectric drive unit 10 of the piezoelectric drive device 11 illustrated in FIGS. 1A and 1B is an example, and is not limited thereto. As long as a configuration which employs 10 piezoelectric drive units 10 is adopted, the arrangement is not particularly limited. Similarly, an arrangement of the piezoelectric drive unit 10 of the piezoelectric drive device 11A illustrated in FIG. 7 is also an example, and is not limited thereto. As long as a configuration which employs 100 piezoelectric drive units 10 is adopted, the arrangement is not particularly limited. Similarly, an arrangement of the piezoelectric drive unit 10 of the piezoelectric drive device 11B is also an example, and is not limited thereto. As long as a configuration which employs 1,000 piezoelectric drive units 10 is adopted, the arrangement is not particularly limited. The number of the piezoelectric drive units 10 is not limited to 10, 100, or 1,000. The number may be set to a rounded-up value of a quotient obtained by dividing the output of the employed piezoelectric drive unit 10 (single body piezoelectric drive device) from the output required for the piezoelectric drive device.

The single body piezoelectric drive device which can be employed as the piezoelectric drive unit 10 is not limited to the above-described single body piezoelectric drive device S3. It is possible to employ various single body piezoelectric drive devices which are present in a hatched region illustrated in FIG. 6.

FIG. 8 is a table illustrating an example of a single body piezoelectric drive device which can be employed as the piezoelectric drive unit 10. FIG. 8 illustrates six single body piezoelectric drive devices S1 to S6 whose sizes are different from each other. In order to illustrate a difference between sizes of the devices, dimensions (length L×width W×thickness [mm]) of the piezoelectric substance are representatively illustrated. The first single body piezoelectric drive device S1 is the largest, the subsequent devices sequentially decrease in dimensions, and the sixth single body piezoelectric drive device S6 is the smallest. Four types of the single body piezoelectric drive devices S1 to S4 from above in which a thickness H of the piezoelectric substance is 150 µm or greater are single body piezoelectric drive devices including the piezoelectric vibrating body having the piezoelectric substance obtained through a bulk forming process (to be described later). Two types of the single body piezoelectric drive devices S5 and S6 from below in which the thickness H of the piezoelectric substance is smaller than 150 µm single body piezoelectric drive devices including the piezoelectric vibrating body having the piezoelectric substance obtained through a thin film forming process (to be described later).

Dimensions (length L×width W×thickness [mm]) of the piezoelectric substance of the respective single body piezoelectric drive devices S1 to S6, a thickness [mm] of the vibrating plate (corresponding to the vibrating body portion 210), and a total thickness (thickness of two piezoelectric vibrating bodies and vibrating plates) [mm], the weight Wt [kg], the output Pw [W], an application voltage [V], and the power-to-weight ratio Pw/Wt [W/kg] of the single body piezoelectric drive device are as illustrated in FIG. 8. The application voltage is a voltage applied to the piezoelectric substance via an electrode.

Figure 9:
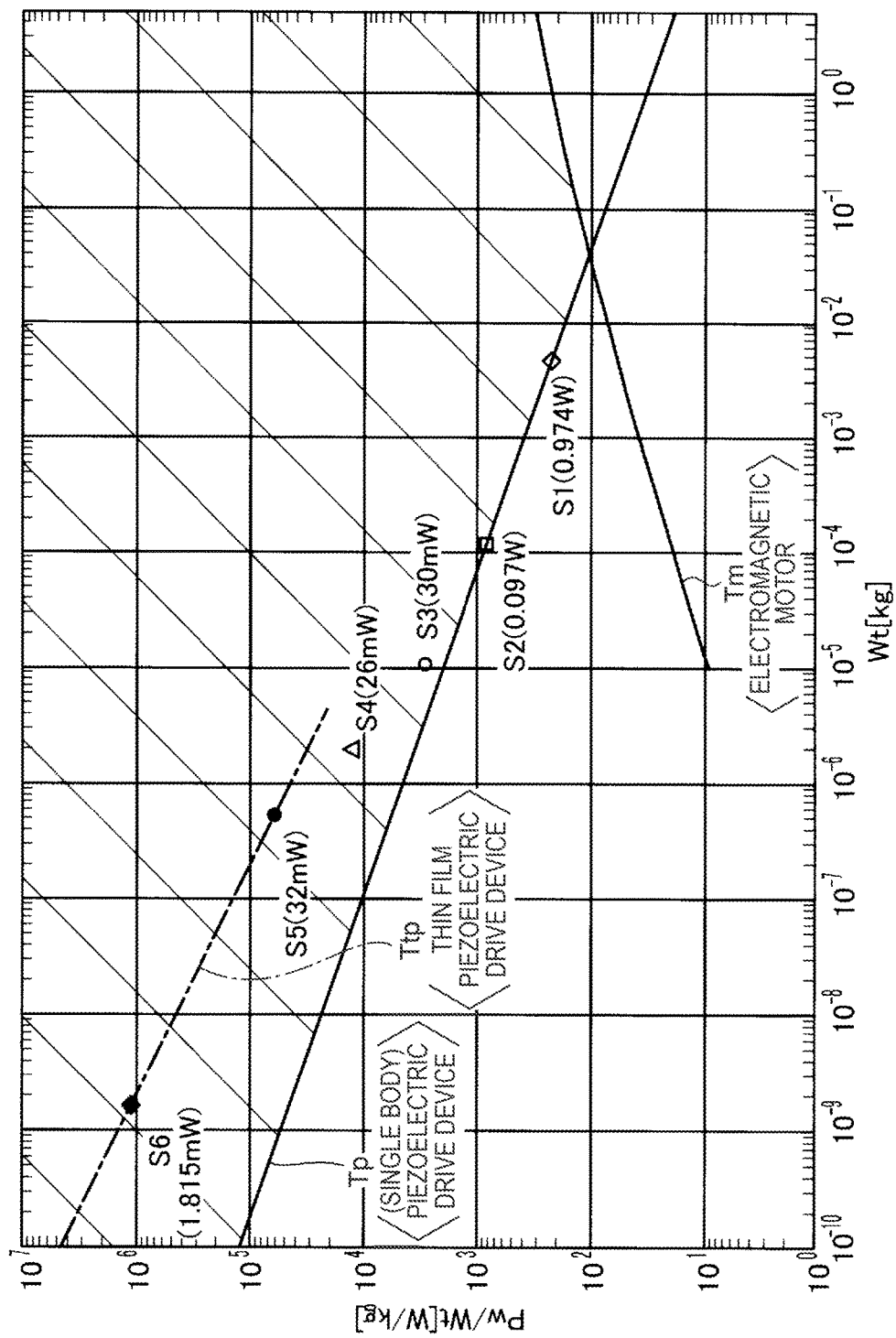
FIG. 9 is a graph illustrating a relationship between the weight and a power-to-weight ratio of the respective single body piezoelectric drive devices illustrated in FIG. 8.
Figure 11A:
FIGS. 11A to 11F are views for describing a thin film forming process of a piezoelectric vibrating body.
Figure 11B:
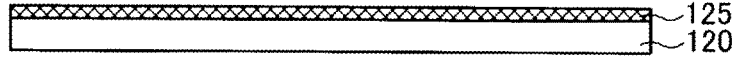
Figure 11C:
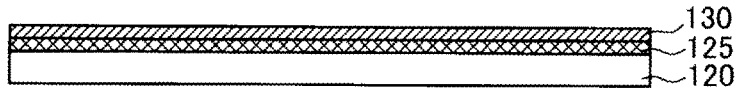
Figure 11D:
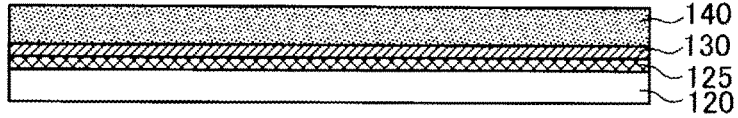
Figure 11E:
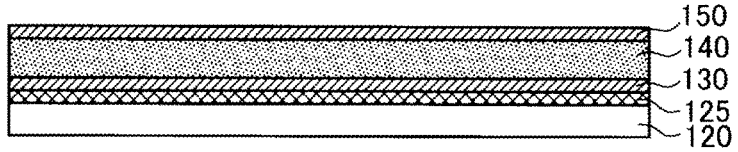
Figure 11F:
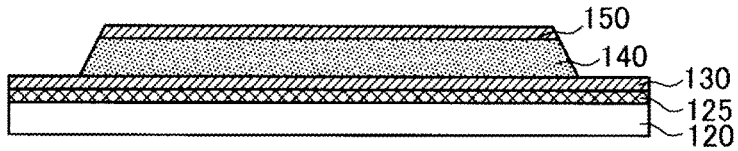

FIG. 9 is a graph illustrating a relationship between the weight Wt and the power-to-weight ratio Pw/Wt of the respective single body piezoelectric drive devices S1 to S6 illustrated in FIG. 8. Similarly to FIG. 6, FIG. 9 illustrates a double-logarithmic graph in which the horizontal axis represents the weight Wt [kg] of the drive device and the vertical axis represents the power-to-weight ratio Pw/Wt [W/kg]. As illustrated in FIG. 9, the respective single body piezoelectric drive devices S1 to S6 are present in a hatched region corresponding to the hatched region illustrated in FIG. 6.

The power-to-weight ratio Pw/Wt of the first to third single body piezoelectric drive devices S1 to S3 sequentially becomes higher as the weight Wt becomes lighter in accordance with the miniaturized piezoelectric substance. The first and second single body piezoelectric drive devices S1 and S2 have a value on the boundary characteristic Tp of the piezoelectric drive device, and the third single body piezoelectric drive device S3 has a value which is slightly greater than the value on the boundary characteristic Tp of the piezoelectric drive device corresponding to the weight Wt. The third single body piezoelectric drive device S3 is the single body piezoelectric drive device which is used as the above-described piezoelectric drive unit 10. The fourth single body piezoelectric drive device S4 is further miniaturized, and the weight Wt becomes lighter than the third single body piezoelectric drive device S3. The power-to-weight ratio Pw/Wt becomes higher in accordance with the lightening of weight. However, compared to the third single body piezoelectric drive device S3, the power-to-weight ratio Pw/Wt has the much higher value than the value on the boundary characteristic Tp of the piezoelectric drive device corresponding to the weight Wt. In the fifth and sixth single body piezoelectric drive devices S5 and S6, the weight Wt also becomes lighter in accordance with the miniaturized piezoelectric substance. The power-to-weight ratio Pw/Wt of the fifth and sixth single body piezoelectric drive devices S5 and S6 becomes higher in accordance with lightening of weight. However, the two single body piezoelectric drive devices S5 and S6 are formed through a thin film forming process as described above. Each power-to-weight ratio Pw/Wt has a higher value than the value on the boundary characteristic Tp of the piezoelectric drive device corresponding to the weight Wt, and has a value on a characteristic Ttp of a thin film piezoelectric drive device.

FIG. 10 is a table illustrating an example of the number of single body piezoelectric drive devices required when the piezoelectric drive device is configured to include the respective single body piezoelectric drive devices S1 to S6 illustrated in FIG. 8. If the number of the single body piezoelectric drive devices S1 illustrated in FIG. 10 is used, it is possible to configure the piezoelectric drive devices whose outputs Pw are 10 W, 30 W, and 100 W. If the number of the single body piezoelectric drive devices S2 illustrated in FIG. 10 is used, it is possible to configure the piezoelectric drive devices whose outputs Pw are 1 W, 3 W, 10 W, 30 W, and 100 W. If the number of the single body piezoelectric drive devices S3 to S6 illustrated in FIG. 10 is used, it is possible to configure the piezoelectric drive devices whose outputs Pw are 0.3 W, 1 W, 3 W, 10 W, 30 W, and 100 W. It is possible to configure the piezoelectric drive devices which have various outputs by using the number corresponding to a desired output Pw. An output value of the respective piezoelectric drive device is an example, and is not limited thereto. Any desired output of 0.3 W or greater can be set. In this case, the number is set to a rounded-up value of a quotient obtained by dividing the output of the single body piezoelectric drive device used as the piezoelectric drive unit 10 from the output required for the piezoelectric drive device. In this manner, it is possible to configure the piezoelectric drive device which has the required output.

The piezoelectric vibrating body formed through a bulk forming process is manufactured by using various general manufacturing methods. For example, a powdery piezoelectric substance material is subjected to pressure forming and sintering so as to form the piezoelectric substance. The piezoelectric vibrating body can be manufactured by forming an electrode through a film forming process in which an electrode material is subjected to sputtering or vacuum deposition on the formed piezoelectric substance. In a case of the piezoelectric vibrating body formed through the bulk forming process, the substrate 120 illustrated in FIGS. 2A to 2C can also be omitted.

For example, the piezoelectric vibrating body formed through a thin film forming process can be manufactured by performing a thin film forming process described below.

FIGS. 11A to 11F are views for describing the thin film forming process of the piezoelectric vibrating body. FIGS. 11A to 11F illustrate a process of forming a piezoelectric element 110d on the substrate 120 which is illustrated in the upper part of the right half in FIGS. 2A to 2C. In Step S110, the substrate 120 is prepared, and an insulating layer 125 is formed on a surface of the substrate 120. For example, as the insulating layer 125, a $SiO_2$ layer formed by performing thermal oxidation on the surface of the substrate 120 can be utilized. In addition, as the insulating layer, it is possible to use an organic material such as alumina ($Al_2O_3$), acrylic, and polyimide. If the substrate 120 is an insulator, a process of forming the insulating layer 125 can be omitted.

In Step S120, the first electrode 130 is formed on the insulating layer 125. For example, the first electrode 130 can be formed by means of sputtering.

In Step S130, the piezoelectric substance 140 is formed on the first electrode 130. Specifically, the piezoelectric substance 140 can be formed by using a solution coating method, for example, a sol-gel method. That is, a sol-gel solution of the piezoelectric substance material is dropped onto the substrate 120 (first electrode 130), and the substrate 120 is rotated fast, thereby forming a thin film of the sol-gel solution on the first electrode 130. Thereafter, the thin film is calcined at a temperature of 200° C. to 300° C., thereby forming a first layer of the piezoelectric substance material on the first electrode 130. Thereafter, a cycle of dropping the sol-gel solution, fast rotation, and calcination is repeated multiple times, thereby forming a piezoelectric substance layer having a desired thickness on the first electrode 130. The thickness of one piezoelectric substance layer formed during one cycle depends on the viscosity of the sol-gel solution or the rotation speed of the substrate 120, but the thickness is approximately 50 nm to 150 nm. After the piezoelectric substance layer having the desired thickness is formed, the piezoelectric substance layer is sintered at a temperature of 600° C. to 1,000° C., thereby forming the piezoelectric substance 140. If the thickness of the sintered piezoelectric substance 140 is set to 50 nm (0.05 μm) to 20 μm, a miniaturized piezoelectric drive unit 10 can be implemented. If the thickness of the piezoelectric substance 140 is set to 0.05 μm or greater, a sufficiently strong force can be generated in response to expansion or contraction of the piezoelectric substance 140. If the thickness of the piezoelectric substance 140 is set to 20 μm or smaller, the sufficiently strong force can be generated even if a voltage applied to the piezoelectric substance 140 is set to 600 V or smaller. As a result, the drive circuit 300 for driving the piezoelectric drive unit 10 can be configured to include an inexpensive element. The thickness of the piezoelectric substance may be set to 400 nm or greater. In this case, the force generated by the piezoelectric element can be stronger. A temperature or a period of time for calcination and sintering is an example, and is appropriately selected depending on the piezoelectric substance material.

When the thin film of the piezoelectric substance material is formed by using the sol-gel method and then is sintered, compared to a sintering method in the related art in which raw material powder is mixed and sintered, there are advantages in that (a) the thin film is easily formed, (b) the material is easily crystallized by being aligned in a lattice direction, and (c) pressure resistance of the piezoelectric substance can be improved.

In Step S140, the second electrode 150 is formed on the piezoelectric substance 140. Similarly to the first electrode, the second electrode 150 can be formed by means of sputtering.

In Step S150, patterning is performed on the second electrode 150 and the piezoelectric substance 140. According to the embodiment, the patterning is performed on the second electrode 150 and the piezoelectric substance 140 by means of ion milling using an argon ion beam. Controlling a period of time for the ion milling enables the patterning to be performed on only the second electrode 150 and piezoelectric substance 140, and enables the patterning not to be performed on the first electrode 130. Instead of performing the patterning using the ion milling, the patterning may be performed by using any other patterning method (for example, dry etching using chlorine-based gas).

As described above, as the piezoelectric drive unit, the piezoelectric drive device is configured to include the multiple miniaturized and lightweight piezoelectric drive devices (single body piezoelectric drive device) whose power-to-weight ratio is high. In this manner, it is possible to configure the piezoelectric drive device which has high output of 0.3 W or greater, while the power-to-weight ratio can be maintained so as to be equal to the power-to-weight ratio of one piezoelectric drive device. Compared to the electromagnetic motor having the same output, it is possible to configure the more lightweight piezoelectric drive device.

Preferably, the number of the piezoelectric drive units 10 configuring the piezoelectric drive device is 10 or more, more preferably 20 or more, much more preferably 100 or more, and most preferably 1,000 or more. If the number of the piezoelectric drive units 10 is increased, as the piezoelectric drive unit 10, it is possible to use the further miniaturized and more lightweight piezoelectric drive device (single body piezoelectric drive device) whose power-to-weight ratio Pw/Wt is higher. Accordingly, it is possible to configure the lightweight piezoelectric drive device whose power-to-weight ratio and output are higher.

In a case of the thin film forming process, the piezoelectric vibrating body 100 becomes thinner compared to that obtained through the bulk forming process. Accordingly, the single body piezoelectric drive device configuring the piezoelectric drive unit 10 can be lighter, and the power-to-weight ratio can be higher. Even if the length L and the width W of the piezoelectric substance 140 are miniaturized, a change degree of the output Pw is small as is understood from comparison between the single body piezoelectric drive device S3 and the single body piezoelectric drive device S4 in FIG. 8. This is due to the fact that a resonance frequency of the piezoelectric substance becomes higher as the length L and the width W are further miniaturized. Therefore, the power-to-weight ratio can be higher by miniaturizing the length L and the width W. As described above, the power-to-weight ratio can be higher by miniaturizing the dimensions (length L×width W×thickness H) of the piezoelectric substance 140. Therefore, using 10 or more single body piezoelectric drive devices obtained through the thin film forming process as the piezoelectric drive unit 10 is advantageous in that the power-to-weight ratio becomes higher, and is advantageous in that the lightweight piezoelectric drive device having the high output can be configured while the high power-to-weight ratio can be maintained.

As described above, preferably, the single body piezoelectric drive device used as the piezoelectric drive unit 10 has the weight Wt and the power-to-weight ratio Pw/Wt which are present in a hatched region illustrated in FIG. 9. A relationship between the power-to-weight ratio Pw/Wt [W/kg] and the weight Wt [kg] of the boundary characteristic Tp of the piezoelectric drive device which indicates a boundary line of the hatched region is expressed by Expression (1) below, based on the two single body piezoelectric drive devices S1 and S2 illustrated in FIG. 8.

$$\log_{10}(Pw/Wt) = -0.373 \cdot \log_{10}(Wt) + 1.448 \quad (1)$$

Therefore, preferably, the single body piezoelectric drive device used as the piezoelectric drive unit has the power-to-weight ratio Pw/Wt which satisfies Expression (2) below.

$$\log_{10}(Pw/Wt) \geq -0.373 \cdot \log_{10}(Wt) + 1.448 \quad (2)$$

However, this condition is limited to a region whose weight is lighter (Wt<0.04 kg) than the weight Wt in which the boundary characteristic Tp of the piezoelectric drive device and the characteristic Tm of the electromagnetic motor intersect each other so that the power-to-weight ratio Pw/Wt of the electromagnetic motor becomes higher.

A relationship between the power-to-weight ratio Pw/Wt [W/kg] and the weight Wt [kg] of the characteristic Ttp of the thin film piezoelectric drive device illustrated in FIG. 9 is expressed by Expression (3) below, based on the two single body piezoelectric drive devices S5 and S6 illustrated in FIG. 8.

$$\log_{10}(Pw/Wt) = -0.498 \cdot \log_{10}(Wt) + 1.653 \quad (3)$$

Therefore, preferably, when the single body piezoelectric drive device used as the piezoelectric drive unit 10 is the thin film piezoelectric drive device, the thin film piezoelectric drive device has the power-to-weight ratio Pw/Wt which satisfies Expression (4) below.

$$\log_{10}(Pw/Wt) \geq -0.498 \cdot \log_{10}(Wt) + 1.653 \quad (4)$$

However, similarly, this condition is limited to the region whose weight is lighter (Wt<0.04 kg) than the weight Wt in which the boundary characteristic Tp of the piezoelectric drive device and the characteristic Tm of the electromagnetic motor intersect each other so that the power-to-weight ratio Pw/Wt of the electromagnetic motor becomes higher.

Preferably, the weight Wt of the piezoelectric drive unit 10, that is, the piezoelectric drive device (single body piezoelectric drive device) configuring the piezoelectric drive unit 10 falls within a range of 1 μg to 5 g (refer to FIG. 8). In a viewpoint of increasing the power-to-weight ratio Pw/Wt, further miniaturized and more lightweight device is preferable, and more preferably the weight Wt falls within a range of 1 μg to 100 mg. However, the lower limit value is not limited thereto, and the further miniaturized and more lightweight device can also be used. Preferably, the output Pw of the piezoelectric drive unit 10 falls within a range of 0.001 W to 1 W (refer to FIG. 8). However, the lower limit value is not limited thereto, and the device having lower output can be used. The above-described thin film forming process enables the piezoelectric drive unit 10 to be further miniaturized and to become thinner. Therefore, a much high power-to-weight ratio can be obtained.

For example, the length L of the piezoelectric substance 140 can be set to a range of 0.2 mm to 30 mm, the width W can be set to a range of 0.02 mm to 9 mm, and the thickness H can be set to a range of 0.002 (2 μm) mm to 1 mm. The piezoelectric substance 140 whose thickness H is 0.15 mm (150 μm) or greater can be manufactured through the bulk forming process. The piezoelectric substance 140 whose thickness H is smaller than 0.15 mm can be manufactured through the thin film forming process.

Preferably, the thickness H of the piezoelectric substance 140 formed through the thin film forming process falls within a range of 50 nm (0.05 μm) to 20 μm, for example. The thin film of the piezoelectric substance 140 having the thickness falling within this range can be easily formed by using the thin film forming process (film forming process). If the thickness of the piezoelectric substance 140 is set to 0.05 μm or greater, a sufficiently strong force can be generated in response to expansion or contraction of the piezoelectric substance 140. If the thickness of the piezoelectric substance 140 is set to 20 μm or smaller, the piezoelectric vibrating body 100 (piezoelectric drive unit 10) can be sufficiently miniaturized. If the thickness of the piezoelectric substance 140 is set to 20 μm or smaller, the sufficiently strong force can be generated even if a voltage applied to the piezoelectric substance 140 is set to 600 V or smaller. Therefore, the drive circuit 300 for driving the piezoelectric drive unit 10 can be configured to include an inexpensive element.

If the piezoelectric substance 140 is formed using a sol-gel method, it is preferable since a thin piezoelectric substance is easily formed. A crystal lattice direction of the piezoelectric substance is easily aligned. Accordingly, a shape of the piezoelectric substance can be greatly deformed when the same voltage is applied thereto. In addition, it is preferable since pressure resistance can be increased. The piezoelectric substance 140 may be formed using a sputtering method. The sputtering method can also achieve the same advantageous effect as that of the sol-gel method.

According to the embodiment, as the substrate 120, the piezoelectric elements (110a to 110e) are formed on the substrate having a high value of the mechanical quality factor Qm such as the substrate made of Si. Accordingly, compared to a case where this substrate 120 is not provided, it is possible to increase the value of the mechanical quality factor Qm of the piezoelectric drive unit 10. In particular, the value of the mechanical quality factor Qm of the substrate made of Si shows approximately one hundred thousands. Therefore, if the substrate 120 made of Si is used, it is possible to increase the value of the mechanical quality factor Qm of the piezoelectric drive unit 10.

B. Another Embodiment of Piezoelectric Drive Device

In order that the substrate made of Si is used as the substrate of the piezoelectric vibrating body and functions as the vibrating plate, the above-described embodiment employs the piezoelectric drive device 11E (refer to FIGS. 9A to 9C) in which the piezoelectric drive device having the piezoelectric vibrating body and the vibrating plate which are integrally formed using a film forming process is fixed by adhering to the support portion 310 of the support body 30. In contrast, as will be described below, the piezoelectric vibrating body and the vibrating plate are integrally formed using the film forming process. In addition to this integral forming, the support body can also be further integrally formed.

Figure 12A:
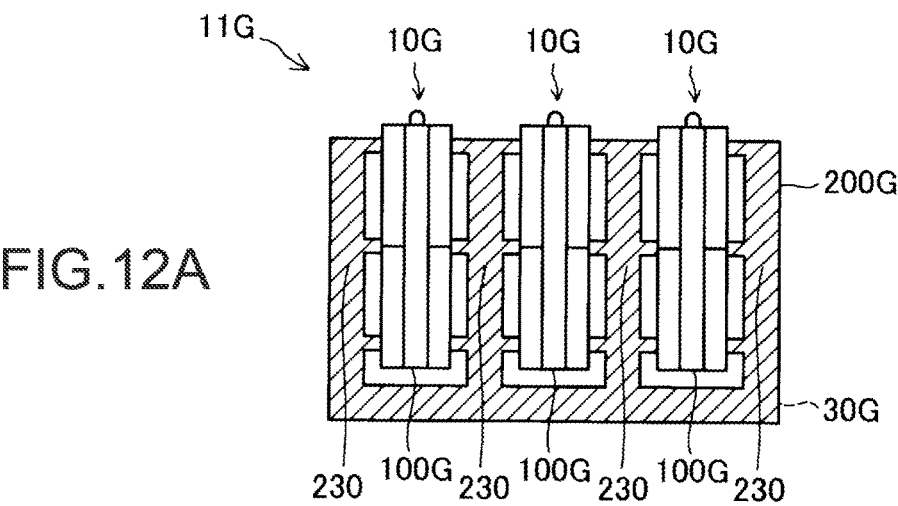
FIGS. 12A and 12B are schematic configuration views of a piezoelectric drive device according to another embodiment.
Figure 12B:
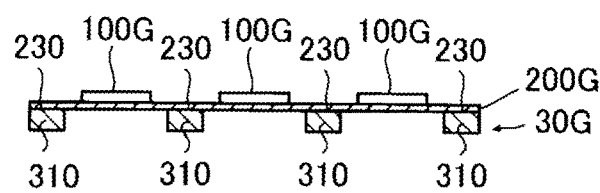
Figure 13A:
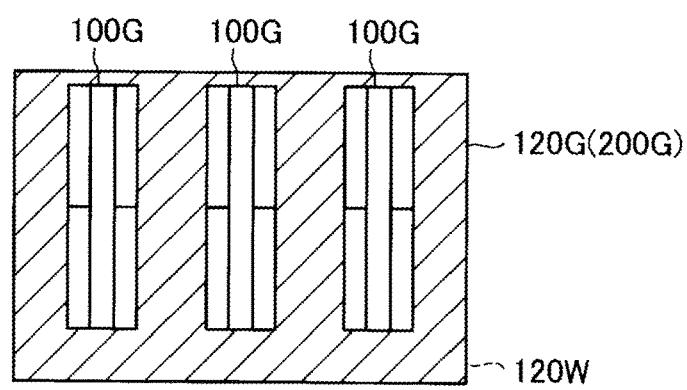
FIGS. 13A and 13B are views for describing one part of an example in a manufacturing process of the piezoelectric drive device illustrated in FIGS. 12A and 12B.
Figure 13B:
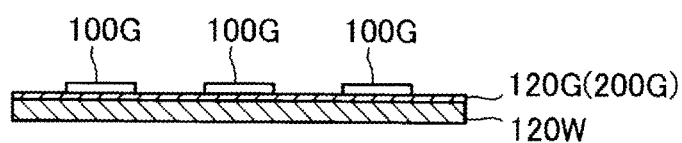

FIGS. 12A and 12B are schematic configuration diagrams of a piezoelectric drive device 11G according to another embodiment, and are drawings corresponding to FIGS. 1A and 1B. FIG. 12A is a plan view of the piezoelectric drive device 11G, and FIG. 12B is a side view thereof. In order to facilitate the following illustration and description, FIGS. 12A and 12B illustrate a configuration example in which three piezoelectric drive units 10G are arranged in a vibrating plate 200G. However, without being limited thereto, a configuration can be adopted in which various numbers of piezoelectric drive units 10G are arranged in the vibrating plate 200G.

The piezoelectric drive device 11G is configured so that a piezoelectric vibrating body 100G serving as the piezoelectric drive unit 10G is integrally formed on an upper surface (first surface) of the vibrating plate 200G. The support portion 310 configuring a support body 30G is integrally formed at a position corresponding to the fixing portion 230 on a lower surface (second surface) of the vibrating plate 200G. The piezoelectric drive device 11G can be manufactured using the film forming process.

FIGS. 13A to 15C are views for describing an example of a manufacturing process of the piezoelectric drive device 11G. First, as illustrated in a side view of FIG. 13B, a SiO$_2$ layer 120G serving as the vibrating plate 200G is formed by oxidizing the upper surface of the Si wafer 120W. As illustrated in a plan view of FIG. 13A, the piezoelectric vibrating body 100G is formed on the upper surface. A method of forming the piezoelectric vibrating body 100G is the same as that of the piezoelectric vibrating body 100 (refer to FIGS. 2A to 2C and FIGS. 11A to 11F) according to the embodiment. Thus, description thereof will be omitted herein. The vibrating plate 200G may be formed by forming alumina on the upper surface of the Si wafer 120W.

Figure 14A:
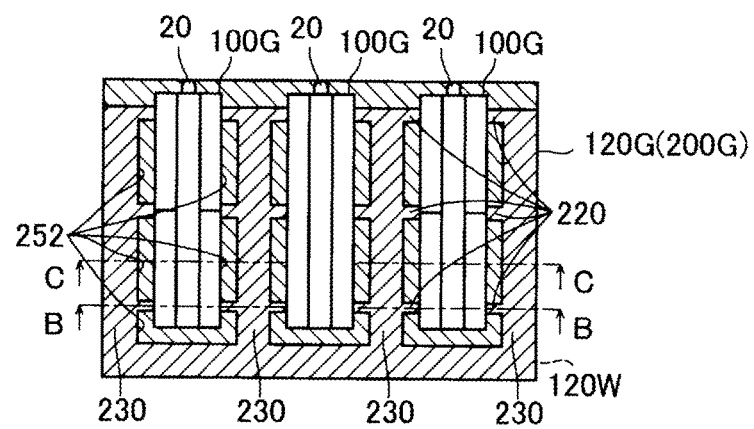
FIGS. 14A to 14C are views for describing another part of the example in the manufacturing process of the piezoelectric drive device illustrated in FIGS. 12A and 12B.
Figure 14B:
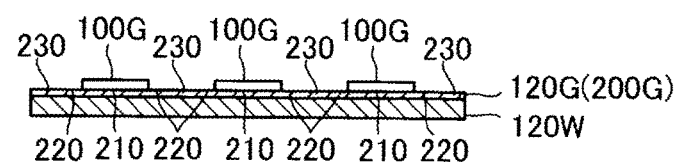
Figure 14C:
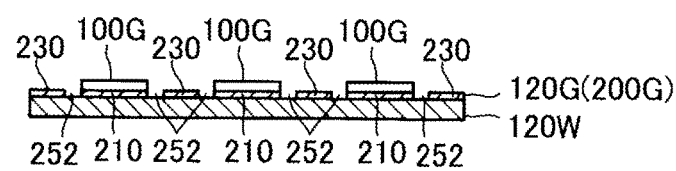

Next, as illustrated in a plan view of FIG. 14A, a sectional view of FIG. 14B which is taken along line B-B in FIG. 14A, and a sectional view of FIG. 14C which is taken along line C-C in FIG. 14A, a portion of the SiO$_2$ layer 120G (vibrating plate 200G) around the respective piezoelectric vibrating bodies 100G is removed by means of etching, thereby forming the protrusion portion 20, the vibrating body portion 210, the connection portion 220, and the fixing portion 230.

Figure 15A:
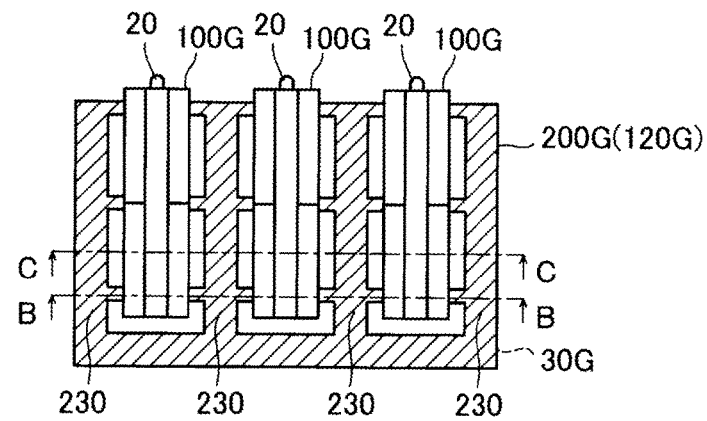
FIGS. 15A to 15C are views for describing further another part of the example in the manufacturing process of the piezoelectric drive device illustrated in FIGS. 12A and 12B.
Figure 15B:
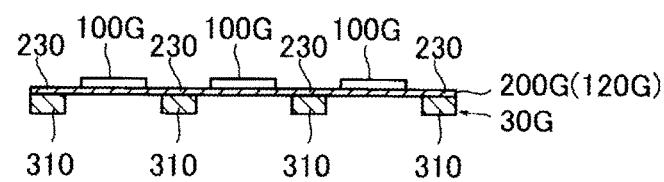
Figure 15C:
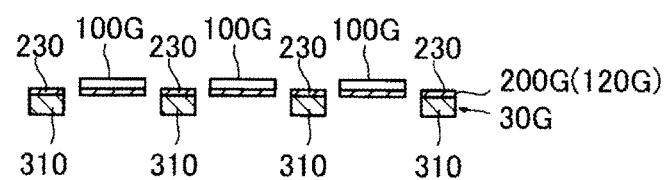

Next, as illustrated in a plan view of FIG. 15A, a sectional view of FIG. 15B which is taken along line B-B in FIG. 15A, and a sectional view of FIG. 15C which is taken along line C-C in FIG. 15A, in order that a portion of the Si wafer 120W which corresponds to the fixing portion 230 along a long side direction of the vibrating body portion 210 of the vibrating plate 200G (SiO$_2$ layer 120G) remain as the support portion 310, the other portion is removed by means of etching, and the support body 30G is formed. In this manner, it is possible to manufacture the piezoelectric drive device 11G (refer to FIGS. 12A and 12B) in which the support body 30G is integrally formed.

Although the illustration is omitted, the multiple piezoelectric drive devices 11G can be formed on the Si wafer 120W. Accordingly, the multiple piezoelectric drive devices 11G are separated by means of laser dicing. In this manner, the multiple piezoelectric drive devices 11G can be manufactured at a time by using a single sheet of the Si wafer 120W.

Figure 16:
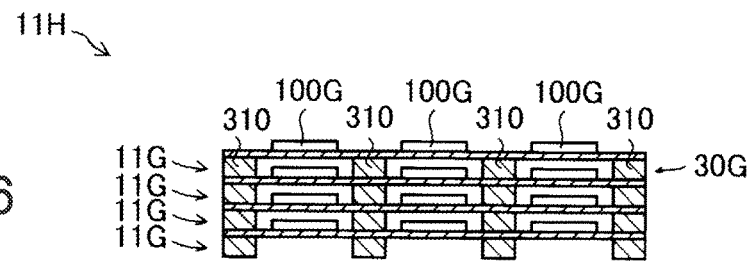
FIG. 16 is a side view illustrating a schematic configuration of a piezoelectric drive device according to further another embodiment.

FIG. 16 is a side view illustrating a schematic configuration of a piezoelectric drive device 11H according to further another embodiment, and is a drawing corresponding to FIG. 7. The piezoelectric drive device 11H has a layered structure in which the piezoelectric drive device 11G (refer to FIGS. 12A and 12B) is stacked on the other piezoelectric drive device 11G via the support portion 310 of a support body 30G so as to stack the multiple piezoelectric drive devices 11G on one another. In the respective piezoelectric drive devices 11G, a lower surface of the support portion 310 of the upper side piezoelectric drive device 11G and the vibrating plate 200G of the lower side piezoelectric drive device 11G adhere to each other by using an adhesive.

C. Embodiment of Device Employing Piezoelectric Drive Device

The above-described piezoelectric drive devices 11 and 11A apply a great force to the driven body by utilizing resonance, and can be applied to various devices. For example, the piezoelectric drive devices 11 and 11A can be used as a drive device for various apparatuses such as a robot (also including an electronic component conveying apparatus (IC handler)), a medication pump, a timepiece calendar feeding device, a printing apparatus (for example, a sheet feeding mechanism. However, not applicable to a head since the vibration plate is not caused to resonate in the piezoelectric drive device used for the head). Hereinafter, a representative embodiment will be described.

Figure 17:
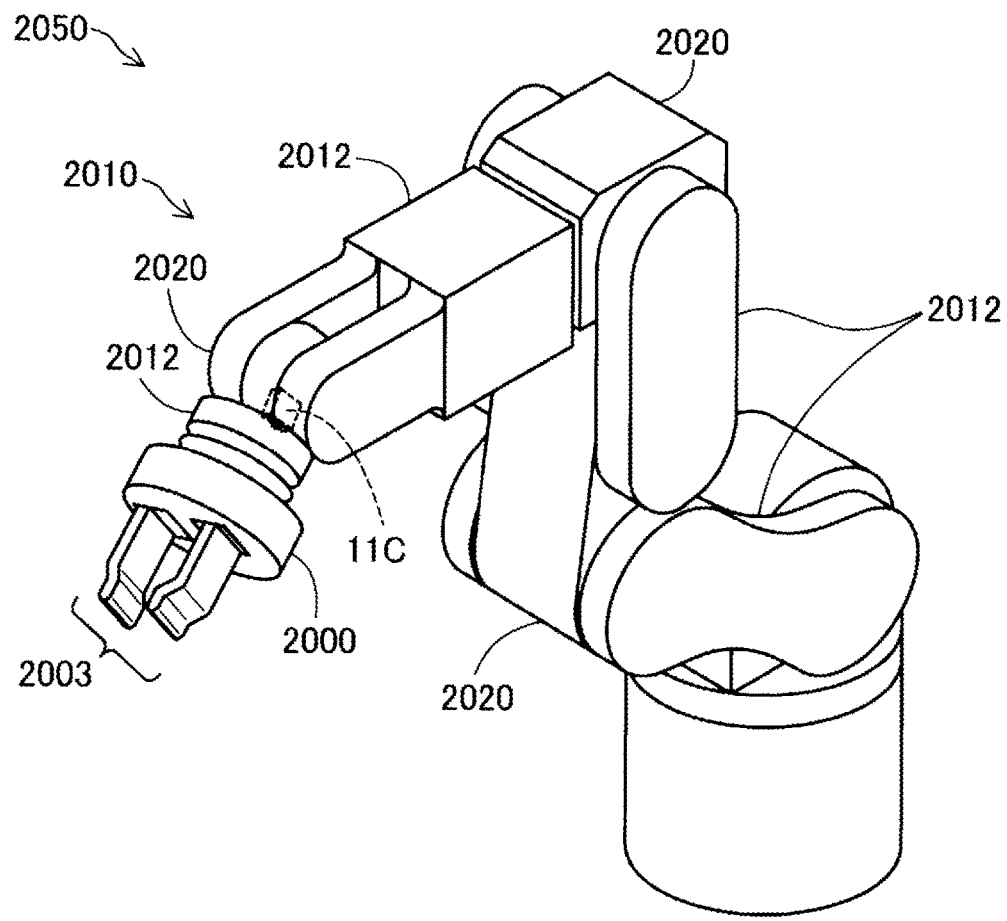
FIG. 17 a view for describing an example of a robot which uses the above-described piezoelectric drive device.

FIG. 17 is a view for describing an example of a robot 2050 which employs the above-described piezoelectric drive device 11A. The robot 2050 has an arm 2010 (also referred to as an "arm unit") which includes multiple link portions 2012 (also referred to as a "link member") and multiple joint portions 2020 for connecting the link portions 2012 to each other in a pivotable or bendable state. The above-described piezoelectric drive device 11A is incorporated in the respective joint portions 2020, and the joint portions 2020 can be pivotally moved or bent at any desired angle by using the piezoelectric drive device 11A. A robot hand 2000 is connected to a distal end of the arm 2010. The robot hand 2000 includes a pair of gripping portions 2003. The piezoelectric drive device 11A is also incorporated in the robot hand 2000. The robot hand 2000 can grip an object by using the piezoelectric drive device 11A so as to open and close the gripping portions 2003. The piezoelectric drive device 11A is also disposed between the robot hand 2000 and the arm 2010. The robot hand 2000 can also be rotated with respect to the arm 2010 by using the piezoelectric drive device 11A.

Figure 18:
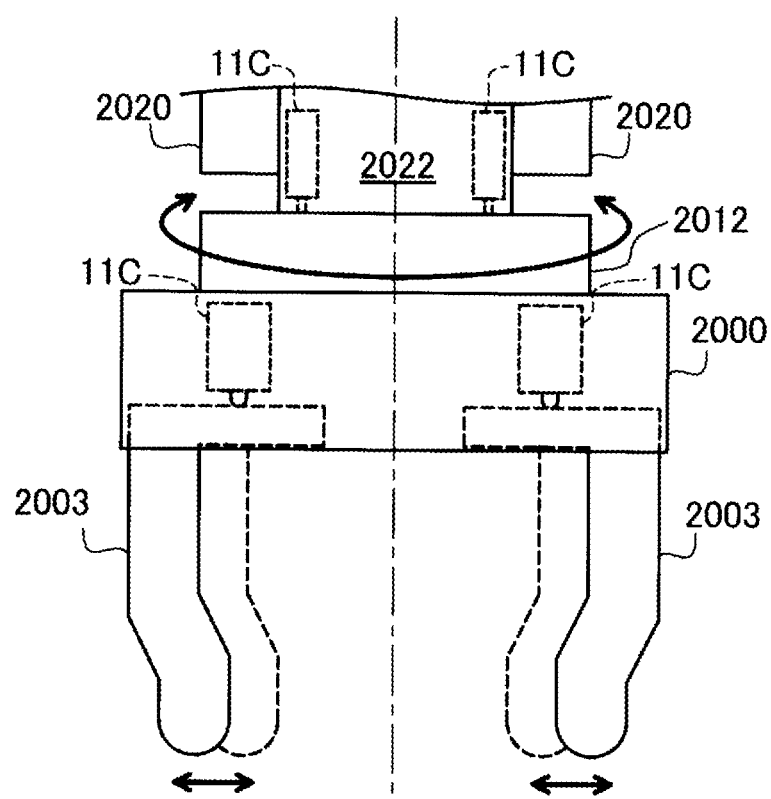
FIG. 18 is a view for describing a wrist portion of the robot illustrated in FIG. 17.

FIG. 18 is a view for describing a wrist portion of the robot 2050 illustrated in FIG. 17. The joint portions 2020 on the wrist interpose a wrist pivotally moving portion 2022 therebetween, and the link portion 2012 on the wrist is attached to the wrist pivotally moving portion 2022 so as to be pivotally movable around a central axis O of the wrist pivotally moving portion 2022. The wrist pivotally moving portion 2022 includes the piezoelectric drive device 11A. The piezoelectric drive device 11A pivotally moves the link portion 2012 on the wrist and the robot hand 2000 around the central axis O. The multiple gripping portions 2003 are erected in the robot hand 2000. A proximal end portion of the gripping portion 2003 is movable inside the robot hand 2000. The piezoelectric drive device 11A is mounted on a base portion of the gripping portion 2003. Therefore, the gripping portions 2003 are moved so as to grip a target by operating the piezoelectric drive device 11A.

As the robot, without being limited to a single arm robot, the piezoelectric drive device 11A can also be applied to a multi-arm robot in which the number of arms is two or more. Here, in addition to the piezoelectric drive device 11A, the joint portion 2020 on the wrist or the inside of the robot hand 2000 includes a power line for supplying power to various devices such as a force sensor and a gyro sensor or signal line for transmitting a signal. Accordingly, enormous wiring is needed. Therefore, it was very difficult to arrange the wiring inside the joint portion 2020 or the robot hand 2000. However, the piezoelectric drive device 11A according to the above-described embodiment can decrease a drive current compared to a normal electric motor or the piezoelectric drive device in the related art. Therefore, it is possible to arrange the wiring even in a small space such as the joint portion 2020 (particularly, a distal end joint portion of the arm 2010) and the robot hand 2000. In addition, the piezoelectric drive device 11A has a miniaturized and lightweight structure. Accordingly, compared to a case of using multiple piezoelectric drive devices needed to obtain the same output in the related art, the piezoelectric drive device 11A is more easily incorporated in the joint portion 2020 or the robot hand 2000. The output needed to operate the joint portion 2020 or the robot hand 2000 is easily generated.

Figure 19:
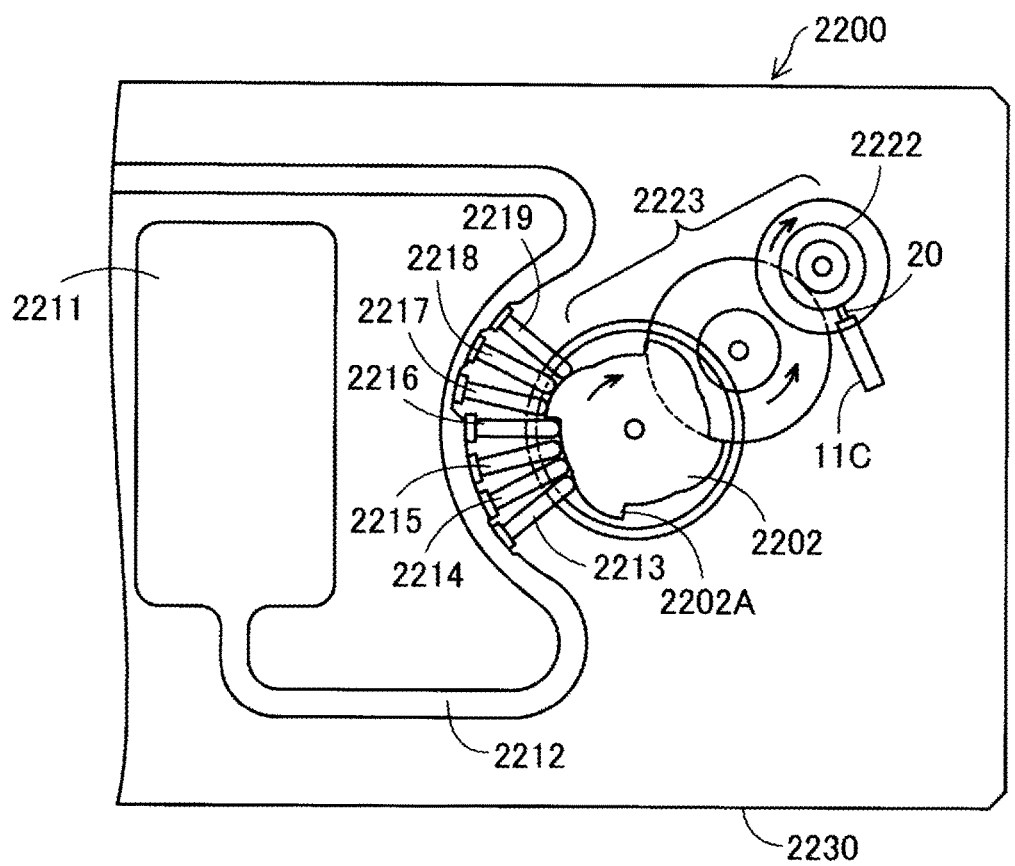
FIG. 19 is a view for describing an example of a liquid feeding pump which uses the above-described piezoelectric drive device.

FIG. 19 is a view for describing an example of a liquid feeding pump 2200 employing the above-described piezoelectric drive device 11A. In the liquid feeding pump 2200, a case 2230 internally has a reservoir 2211, a tube 2212, the piezoelectric drive device 11A, a rotor 2222, a deceleration transmission mechanism 2223, a cam 2202, and multiple fingers 2213, 2214, 2215, 2216, 2217, 2218, and 2219. The reservoir 2211 is an accommodation section for accommodating a liquid which is a transport target. The tube 2212 is used in order to transport the liquid fed from the reservoir 2211. The multiple protrusion portions 20 of the piezoelectric drive device 11A are disposed in a state of being pressed against a side surface of the rotor 2222, and the piezoelectric drive device 11A rotatably drives the rotor 2222. A rotation force of the rotor 2222 is transmitted to the cam 2202 via the deceleration transmission mechanism 2223. The fingers 2213 to 2219 are members for blocking the tube 2212. If the cam 2202 is rotated, the fingers 2213 to 2219 are sequentially pressed radially outward by a protrusion portion 2202A of the cam 2202. The fingers 2213 to 2219 block the tube 2212 sequentially from the upstream side (reservoir 2211 side) in the transport direction. In this manner, the liquid inside the tube 2212 is sequentially transported to the downstream side. According to this configuration, an extremely small amount of the liquid can be accurately fed. Moreover, a miniaturized liquid feeding pump 2200 can be implemented. An arrangement of each member is not limited to the illustrated example. A configuration may be adopted in which a ball disposed in the rotor 2222 blocks the tube 2212 without providing members such as the fingers. The above-described liquid feeding pump 2200 can be utilized for a drug dispensing apparatus which administers a drug solution such as insulin to a human body. Here, a drive current is decreased by using the piezoelectric drive device 11A according to the above-described embodiment, compared to the piezoelectric drive device in the related art. Accordingly, it is possible to minimize power consumption of the drug dispensing apparatus. Therefore, the piezoelectric drive device 11A is particularly effective when the drug dispensing apparatus is driven by a battery.

According to the embodiment, the piezoelectric drive device 11A drives the circumferential surface of the rotor 2222. When the piezoelectric drive device drives the circumferential surface of the rotor as in the embodiment, for example, preferably, the piezoelectric drive devices 11 in FIGS. 2A to 2C are used in a state where the piezoelectric drive devices 11 are individually cut out as illustrated by a form in FIG. 2C. Preferably, the piezoelectric drive devices 11A in FIG. 7 are used by being individually cut out in the layered direction in a state where the piezoelectric drive units are stacked on one another. According to this configuration, it is possible to obtain the stronger drive force.

In the piezoelectric drive devices 11, 11A, 11G, and 11H according to the above-described embodiments, a configuration example has been described in which the multiple piezoelectric drive units 10 or 10G are disposed on one vibrating plate 200 or 200G, but the configuration is not limited thereto. A configuration may be adopted in which the piezoelectric drive units are discretely arranged thereon. In this case, the respective piezoelectric drive units may include each vibrating plate, or may not include the vibrating plate.

Without being limited to the above-described embodiments, application examples, and modification examples, the invention can be implemented using various configurations within the scope not departing from the gist of the invention. For example, technical features in the embodiments, application examples, and modification examples which correspond to technical features in each form described in the summary of the invention can be appropriately replaced or combined with each other in order to partially or entirely solve the above-described problem, or in order to partially or entirely achieve the above-described advantageous effect. Unless the technical features are described herein as essential, the technical features can be appropriately deleted.

The entire disclosure of Japanese Patent Application No. 2015-041957, filed Mar. 4, 2015 is expressly incorporated by reference herein.

What is claimed is:

1. A piezoelectric drive device comprising:
   a single vibrating plate, an outer periphery of the single vibrating plate being in a longitudinal rectangular shape having top and bottom surfaces, first and second sides opposite to each other, and third and fourth sides opposite to each other, the first and second sides being longer than the third and fourth sides, the single vibrating plate having a plurality of through-holes; and
   a plurality of piezoelectric drive units that are disposed on the single vibrating plate, each of the plurality of piezoelectric drive units having:
      a set of piezoelectric elements that are provided on one of the too and bottom surfaces of the single vibrating plate; and
      a projection that is configured to contact a driven body so as to drive the driven body,
   wherein the plurality of projections of the plurality of piezoelectric drive units are all outwardly projected from the first side of the single vibrating plate and are all provided only along the first side of the single vibrating plate,
   the plurality of through-holes are located along an outer edge of each of the set of piezoelectric elements in a plan view,
   wherein the number of the plurality of piezoelectric drive units is at least 10,
   wherein an overall output from the plurality of piezoelectric drive units is at least 0.3 W when 180 V is applied to the plurality of piezoelectric drive units so that the single vibrating plate is deformed inside a plane of the single vibrating plate, and
   wherein a weight of each of the plurality of piezoelectric drive units is 1 μg to 5 g.

2. The piezoelectric drive device according to claim 1, wherein at least one of the plurality of piezoelectric drive units satisfies the following expression:

$$\log_{10}(Pw/Wt) \geq -0.373 \cdot \log_{10}(Wt) + 1.448$$

wherein Wt represents a weight [kg] of one of the plurality of piezoelectric drive units, and Pw represents an output [W] of one of the plurality of piezoelectric drive units.

3. The piezoelectric drive device according to claim 2, wherein at least one of the plurality of piezoelectric drive units satisfies the following expression:

$$\log_{10}(Pw/Wt) \geq -0.498 \cdot \log_{10}(Wt) + 1.653.$$

4. The piezoelectric drive device according to claim 1, wherein an output from each of the plurality of piezoelectric drive units is 0.001 W to 1 W.

5. The piezoelectric drive device according to claim 1, wherein a thickness of each of the set of piezoelectric elements is 0.05 μm to 20 μm.

6. The piezoelectric drive device according to claim 1, wherein the weight of each of the plurality of piezoelectric drive units is 1 μg to 100 mg.

7. The piezoelectric drive device according to claim 1, wherein the number of the plurality of piezoelectric drive units is at least 100.

8. The piezoelectric drive device according to claim 1, wherein the number of the plurality of piezoelectric drive units is at least 1,000.

9. The piezoelectric drive device according to claim 1, wherein each of the set of piezoelectric elements is configured with a substrate, a piezoelectric layer and a pair of electrodes, and the pair of electrodes are provided on opposite surfaces of the piezoelectric layer so that the pair of electrodes sandwich the piezoelectric layer, and
   wherein one of the pair of electrodes is formed on the substrate, the piezoelectric layer is formed on one of the pair of electrodes, and the other of the pair of electrodes is formed on the piezoelectric layer.

10. A robot comprising:
    a plurality of links;
    a plurality of joints, each of the plurality of joints connecting adjacent two of the plurality of links to each other; and
    a piezoelectric drive device, the piezoelectric drive device including:
       a single vibrating plate, an outer periphery of the single vibrating plate being in a longitudinal rectangular shape having top and bottom surfaces, first and second sides opposite to each other, and third and fourth sides opposite to each other, the first and second sides being longer than the third and fourth sides, the single vibrating plate having a plurality of through-holes; and
       a plurality of piezoelectric drive units that are disposed on the single vibrating plate, each of the plurality of piezoelectric units having:
          a set of piezoelectric elements that are provided on one of the top and bottom surfaces of the single vibrating plate; and
          a projection that is configured to contact one of the plurality of links so as to drive one of the plurality of links with respect to one of the plurality of joint,
    wherein the plurality of projections of the plurality of piezoelectric drive units are all outwardly projected from the first side of the single vibrating plate and are all provided only along the first side of the single vibrating plate,
    the plurality of through-holes are located along an outer edge of each of the set of piezoelectric elements in a plan view,
    wherein the number of the plurality of piezoelectric drive units is at least 10,
    wherein an overall output from the plurality of piezoelectric drive units is at least 0.3 W when 180 V is applied to the plurality of piezoelectric drive units so that the single vibrating plate is deformed inside a plane of the single vibrating plate, and wherein a weight of each of the plurality of piezoelectric drive units is 1 μg to 5 g.

* * * * *